US010885099B1

(12) United States Patent
Price et al.

(10) Patent No.: US 10,885,099 B1
(45) Date of Patent: Jan. 5, 2021

(54) SYSTEMS AND METHODS FOR PRESENTING IMAGE CLASSIFICATION RESULTS

(71) Applicant: CAPITAL ONE SERVICES, LLC, McLean, VA (US)

(72) Inventors: Micah Price, The Colony, TX (US); Chi-San Ho, Allen, TX (US); Yue Duan, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/534,375

(22) Filed: Aug. 7, 2019

(51) Int. Cl.
*G06F 16/538* (2019.01)
*G06F 16/51* (2019.01)
*G06F 9/451* (2018.01)
*G06F 16/535* (2019.01)
*G06F 8/65* (2018.01)
*G06N 3/08* (2006.01)
*G06K 9/62* (2006.01)
*G06F 3/0481* (2013.01)
*G06F 3/0482* (2013.01)
(Continued)

(52) U.S. Cl.
CPC .......... *G06F 16/538* (2019.01); *G06F 3/0482* (2013.01); *G06F 3/04817* (2013.01); *G06F 8/65* (2013.01); *G06F 9/451* (2018.02); *G06F 16/51* (2019.01); *G06F 16/535* (2019.01); *G06K 9/6267* (2013.01); *G06N 3/04* (2013.01); *G06N 3/08* (2013.01); *H04N 5/272* (2013.01); *G06K 2209/23* (2013.01)

(58) Field of Classification Search
CPC ........ G06F 16/538; G06F 9/451; G06F 16/50; G06N 3/04; H04N 5/272

USPC ......................................................... 707/722
See application file for complete search history.

(56) References Cited

U.S. PATENT DOCUMENTS 6,038,337 A    3/2000 Lawrence et al.
7,986,339 B2   7/2011 Higgins
(Continued)

FOREIGN PATENT DOCUMENTS

WO    WO 01/46868 A2    6/2001

OTHER PUBLICATIONS

Way Bach Machine Archived Website: CarMax, toyota. URL: https://web.archive.org/web/20190428162854/www.carmax.com/cars/toyota. Archived Apr. 28, 2019.

*Primary Examiner* — Hosain T Alam
*Assistant Examiner* — Tracy M McGhee
(74) *Attorney, Agent, or Firm* — Finnegan, Henderson Farabow, Garrett & Dunner LLP

(57) ABSTRACT

An apparatus for performing image searches including a camera, storage devices storing a set of instructions, and a processor coupled to the at least one storage device and the camera. The instructions configure the at least one processor to perform operations including identifying attributes of the captured image using a classification model; identifying first results based on the identified attributes; selecting a subset of first results based on corresponding probability scores, generating a first graphical user interface including interactive icons corresponding to first results in the subset, an input icon, and a first button. The operations may also include receiving a selection of the first button, performing a search to identify second results, and generating a second graphical user interface displaying the second results.

19 Claims, 20 Drawing Sheets

(51) Int. Cl.
*H04N 5/272* (2006.01)
*G06N 3/04* (2006.01)

(56) References Cited

U.S. PATENT DOCUMENTS

| | | |
|---|---|---|
| 8,019,122 B2 | 9/2011 | Zou et al. |
| 8,180,396 B2 | 5/2012 | Athsani et al. |
| 8,244,025 B2 | 8/2012 | Davis et al. |
| 8,890,655 B2 | 11/2014 | Pederson |
| 8,977,639 B2 | 3/2015 | Petrou et al. |
| 2006/0173769 A1 | 8/2006 | Vales |
| 2013/0044132 A1* | 2/2013 | Athsani ............ H04M 1/72522 345/633 |
| 2013/0117259 A1 | 5/2013 | Ackerman et al. |
| 2015/0019287 A1 | 1/2015 | Sacco et al. |
| 2015/0097962 A1 | 4/2015 | Rauscher et al. |
| 2016/0068156 A1 | 3/2016 | Horii |
| 2016/0232765 A1* | 8/2016 | Pederson ......... G08B 13/19663 |

* cited by examiner

SYSTEMS AND METHODS FOR PRESENTING IMAGE CLASSIFICATION RESULTS

TECHNICAL FIELD

The present disclosure relates generally to systems and methods for classifying images and, more particularly, to systems and methods for classifying images captured with portable devices and generating graphical user interfaces in the portable devices for filtering classification results and/or providing feedback to image identification or classification models.

BACKGROUND

Image classification models may be used to classify or categorize images based on their parameters and/or extracted attributes. Using machine learning methods, such as convolutional neural networks (CNNs), it is possible to categorize images. For example, images may be manipulated to be run in a CNN to either recognize or classify the images. Further, CNNs or—similar machine learning methods—may be employed to extract image parameters that are then correlated with other parameters or attributes for classification. These methods can be powerful to identify or categorize images because the correlations can be highly accurate. Moreover, CNNs may be updated or retrained frequently to accurately capture image parameters.

However, sharing or displaying results of an image classification model can be challenging. Frequently, a classification model returns multiple potential classification results based on a sample image, with each one of the results being associated with a different confidence level. In some embodiments, only the result with highest confidence or score may be presented to the user. The highest confidence result may, nonetheless, be inaccurate (e.g., the model is not properly tuned) or may be undesirable to the user. Hence, as an alternative, multiple classification results may be presented for the user's review. However, limited screen space in portable devices and lower resolutions may result in a review process that is tedious and difficult. In particular, users of portable devices may be required to scroll through multiple different classification options to review and analyze different results. Further, reviewing multiple classification options in portable devices may clutter the limited screen space, making it difficult to identify or select an adequate result. Alternatives of displaying isolated results in independent windows may result in poor user experience because users would be required to scroll through different graphical user interfaces (GUIs) to identify a matching result. Moreover, because portable devices are normally subject to data caps and reduced bandwidths, in many situations it is impracticable to quickly send the results to a portable device.

The disclosed systems and methods for generating graphical user interfaces address one or more of the problems set forth above and/or other problems in the prior art.

SUMMARY

One aspect of the present disclosure is directed to an apparatus for performing image searches. The apparatus may include a camera, at least one storage device storing a set of instructions, and at least one processor coupled to the at least one storage device and the camera. The instructions in the storage device may configure the at least one processor to perform operations comprising: capturing an image by the camera, identifying attributes of the captured image using a classification model, identifying first results based on the identified attributes (the first results being associated with probability scores), selecting a subset of first results based on corresponding probability scores (the first results in the in the subset having an accumulated probability score greater than a threshold probability score), and generating a first graphical user interface. The first graphical user interface may include interactive icons corresponding to first results in the subset, at least one input icon, and a first button. The operations may also include receiving a selection of the first button and, upon receiving the selection of the first button, performing a search to identify second results, where the second search is based on at least one of selected interactive icons or input in the at least one input icon, and generating a second graphical user interface displaying the second results.

Another aspect of the present disclosure is directed a system for performing image searches. The system may include one or more processors and one or more storage devices storing instructions that, when executed, configure the one or more processors to perform operations. The operations may include identifying attributes of a captured image using a classification model, identifying first results based on the identified attributes (the first results being associated with probability scores), selecting a subset of the first results based on corresponding probability scores (the first results in the subset having an accumulated probability score greater than a threshold probability score), and generating a first graphical user interface. The first graphical user interface may include interactive icons corresponding to first results in the subset, at least one input icon, and a button. The operations may also include, upon receiving a selection of the button, performing a search to identify second results (the second search being based on at least one of selected interactive icons or input in the at least one input icon) and generating a second graphical user interface displaying the second results.

Yet another aspect of the present disclosure is directed to a computer-implemented method for performing image searches. The method may include identifying attributes of a captured image using a classification model; identifying first results based on the identified attributes (the first results being associated with probability scores), selecting a subset of the first results based on corresponding probability scores (the first results in the subset having an accumulated probability score greater than a threshold probability score), and generating a first graphical user interface. The first graphical user interface may include interactive icons corresponding to first results in the subset, at least one input icon, and a first button. The operations may also include, upon receiving a selection of the first button, performing a search to identify second results (the second search being based on at least one of selected interactive icons or input in the at least one input icon) and generating a second graphical user interface displaying the second results.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
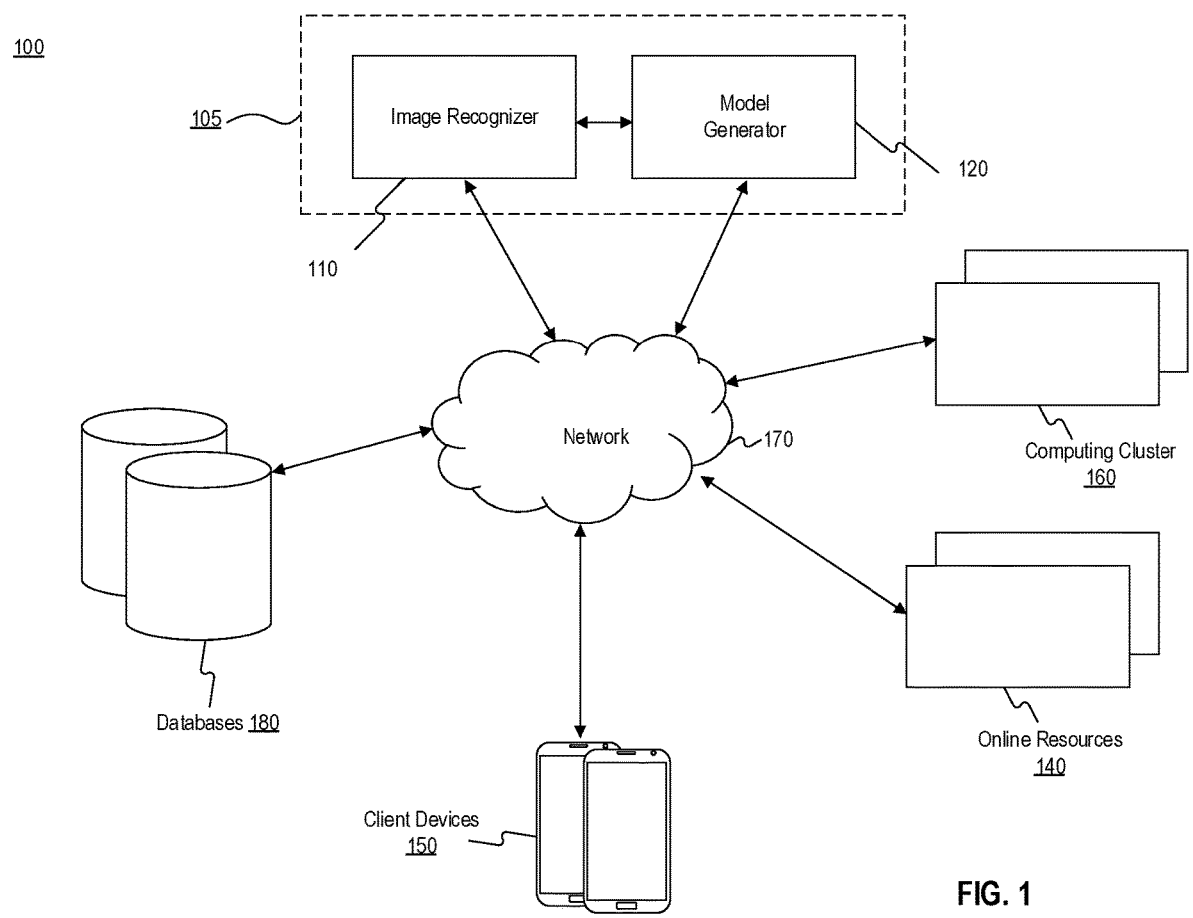
FIG. 1 is a block diagram of an exemplary system, consistent with disclosed embodiments.

The disclosure is generally directed to systems and methods to generate graphical user interfaces (GUIs). The disclosed systems and methods may improve user experience when employing image classification models by generating GUIs that allow users to filter, prioritize, and/or provide feedback to image identification models. For example, the disclosed systems and methods may generate intermediary GUIs that display filters and/or preselected results after an image is captured. Alternatively, or additionally, the intermediary GUIs may be displayed after a user selects or uploads a sample image for an image classification. In some embodiments, the intermediary GUIs may show preliminary results and/or interactive icons with filtering options that may reduce the number of potential image classification results. Thus, intermediary GUIs of the disclosed systems and methods may reduce bandwidth consumed during image classification and improve user experience by reducing the number of results a user needs to review.

Further the disclosed systems and methods may be employed to effectively manage screen space. Particularly for portable devices, in which the screen space is limited, the disclosed systems and methods may generate dynamic GUIs that specifically display elements that are relevant for a user search while removing irrelevant elements. For example, the disclosed methods may include dynamically modifying GUIs based on user selections to maximize screen space by eliminating, minimizing, enlarging, hiding, and/or re-shaping icons based on user selections. Further, to improve GUIs in portable screens, the disclosed systems and methods may determine the number of results displayed based on identification confidence levels and/or user visualization preferences. These GUI configurations may facilitate performing accurate image classification by displaying preliminary classification results to focus user attention in relevant results and showing interactive filters and options that prevent searching for irrelevant images or selecting inaccurate results.

Moreover, the disclosed systems and methods may be used to generate GUIs with interactive elements to easily communicate with, and provide feedback to, image recognizers. For example, in some embodiments of the disclosed systems, image recognizer may employ machine-learning models, such as convolutional neural networks (CNNs) to identify or classify images. The disclosed systems and methods may provide interactive GUIs that allow users to quickly provide feedback to the models. For example, GUIs generated with the disclosed systems and methods may allow users to indicate when classification or identification models are returning inaccurate results. Further, the disclosed systems and methods may enable users to provide corrected results and labeled images, which can be used to retrain classification models and improve the model accuracy. Thus, the disclosed systems and methods may facilitate capturing samples for training datasets used to update identification models.

In such embodiments, the disclosed systems and methods may be employed to leverage user feedback when generating software patches for image classification models. For example, information captured with GUI's configured to gather user input may be used to create patches (i.e., a set of changes to a computer program or its supporting data designed to update, fix, or improve it) for identification or classification models. The patches may create model exceptions based on user inputs when the system identifies trends of model inaccuracies. Alternatively, or additionally, the patches may modify parameters of the model to correct inaccuracies and/or improve model configurations.

The disclosed systems and methods may also improve computer functionality by distributing search tasks between different elements of the system. For example, in the disclosed systems and methods some initial image classification operations may be performed locally in a portable device using machine-learning models like CNNs. This initial search may filter content for a second search that involves communication with a server and may include commercial and/or financing considerations. By distributing tasks at different points of the system architecture, the disclosed systems and methods may reduce network congestion while also allowing the identification of preliminary searches. In such embodiments, the disclosed systems and methods may also modify server query information so it can be easily transmitted in networks with limited bandwidth, such as cellular networks. For example, the disclosed systems and methods may create packets of information to transmit captured images that have modified metadata to facilitate searches and/or allow retraining of the identification models. Further, the use of distributed systems with different search tasks improve operation of portable computing devices because it allows reducing bandwidth required of identification.

Some embodiments of the disclosed systems and methods may be tailored to improve the technical field of identifying images of vehicles. Image identification of vehicles may be particularly useful when using mobile devices because it enables the combination of multiple capabilities currently available in portable devices. For example, the disclosed systems and methods may combine image identification, using a camera and computing power of a smartphone, with native communication and location functions to provide targeted content for the user. In such embodiments, a user may use an image classification process to identify a vehicle in the street. Based on the image classification results and the location of the user, a server may push notifications or information about the automobile and dealers in proximity to the user. Accordingly, the disclosed systems and methods may improve the technical field of recognizing vehicle images by coordinating communication between different elements of the system, reducing latency between the communications, reducing bandwidth utilization, and improving accuracy and relevance of the results presented to the user.

Moreover, the disclosed system and methods may improve the technical field of augmented reality in vehicle identification. The disclosed systems and methods may be employed to generate augmented reality images. For example, results from image classification in the disclosed systems and methods may be used to modify video feeds to include vehicle information and generate augmented reality experiences. Thus, the user may quickly identify vehicles in the user screen based on image classification processes. Modifications to images in the video feed may include displaying identified features of vehicles in the screen and display inventory information available in servers coupled to the device. Such arrangement for augmented reality may improve user experience because it may enable users to quickly identify features of automobiles the user is looking at, with minimal required input from the user.

Reference will now be made in detail to the disclosed embodiments, examples of which are illustrated in the accompanying drawings.

FIG. 1 is a block diagram of an exemplary system 100, consistent with disclosed embodiments. System 100 may be used to support image recognition in portable devices and for communication of targeted content to portable devices, consistent with disclosed embodiments. System 100 may include an inventory search system 105 which may include an image recognizer 110 and a model generator 120. System 100 may additionally include online resources 140, client devices 150, computing clusters 160, and databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services or servers that store web pages for vehicle manufacturers and/or vehicle dealers. Alternatively, or additionally, online resources 140 may be associated with service providers such, such as financing service providers. In such embodiments, online resources 140 may be configured to determine availability of financial services for users based on query request and information stored in databases 180. Moreover, online resources 140 may also be associated with website aggregators, such as Kelley Blue Book®, a or cloud computing service. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of identified vehicles alerts, and/or completion messages and notifications. In some embodiments, online resources 140 may include servers associated with both vehicle dealers and finance services for vehicle purchases. In such embodiments, online resources 140 may store vehicle inventory information (including price, location, and availability) and also store information about client accounts and their credit history.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that when executed by a processor performs Internet-related communication, such as TCP/IP, and content display processes. For instance, client devices 150 may execute browser software that generates and displays interfaces including content on a display device included in, or connected to, client devices 150.

Client devices 150 may execute applications that allow client devices 150 to communicate with components over network 170, and generate and display content in GUIs via display devices included in client devices 150. Displays of client devices 150 may be configurable to display GUIs as described in connection with FIGS. 15-20. The disclosed embodiments are not limited to any particular configuration of client devices 150. For instance, a client device 150 may be a mobile device that stores and executes mobile applications to perform operations that provide functions offered by inventory search system 105 and/or online resources 140, such as providing information about vehicles in a database 180. In certain embodiments, client devices 150 may be configured to execute software instructions relating to location services, such as GPS locations. For example, client devices 150 may be configured to determine a geographic location and provide location data and time stamp data corresponding to the location data. Alternatively, or additionally, client devices 150 may have camera 520 to capture video and/or images. Client devices 150 are further described in connection with FIG. 5.

Computing clusters 160 may include a plurality of computing devices in communication with other elements of system 100. For example, in some embodiments, computing clusters 160 may be a group of processors in communication through fast local area networks. In other embodiments computing clusters 160 may be an array of graphical processing units configured to work in parallel as a graphics processing unit (GPU) cluster. In such embodiments, computer clusters 160 may include heterogeneous or homogeneous hardware. In some embodiments, computing clusters 160 may include GPU drivers for the various types of GPUs present in cluster nodes, a Clustering Application Programming Interface (API), such as the Message Passing Interface (MPI), and VirtualCL (VCL) cluster platform such as a wrapper for OpenCL™ that allows applications to transparently utilize multiple OpenCL devices in a cluster. In yet other embodiments, computing clusters 160 may operate with distcc (a program to distribute builds of C, C++, Objective C or Objective C++ code across several machines on a network to speed up building), and MPICH (a standard for message-passing for distributed-memory applications used hi parallel computing), Linux Virtual Server™, Linux-HA™, or other director-based clusters that allow incoming requests for services to be distributed across multiple cluster nodes.

In some embodiments, computer clusters 160 may receive requests to generate models. For example, computer clusters 160 may receive a model request from model generator 120 including training data, which may include images of vehicles with labeled metadata. Computer clusters 160 may perform the multiple iterations for generating a classification or identification model based on the training data. For example, computer clusters 160 may perform operations to generate a convolutional neural network that identifies attributes in images of vehicles.

Databases 180 may include one or more computing devices configured with appropriate software to perform operations consistent with providing inventory search system 105, model generator 120, and image classifier 130 with data associated with vehicle images, vehicle features, and stored information about vehicle sales like cost or condition. Databases 180 may include, for example, Oracle™ databases, Sybase™ databases, or other relational databases or non-relational databases, such as Hadoop™ sequence files, HBase™, or Cassandra™. Database(s) 180 may include computing components (e.g., database management system, database server, etc.) configured to receive and process requests for data stored in memory devices of the database(s) and to provide data from the database(s).

While databases 180 are shown separately, in some embodiments databases 180 may be included in or otherwise related to one or more of inventory search system 105, image recognizer 110, model generator 120, image classifier 130, and online resources 140.

Databases 180 may be configured to collect and/or maintain the data associated with vehicles being displayed in online resources 140 and provide it to the inventory search system 105, model generator 120, image classifier 130, and client devices 150. Databases 180 may collect the data from a variety of sources, including, for instance, online resources 140. Databases 180 are further described below in connection with FIG. 4.

Model generator 120 may include one or more computing systems configured to generate models to classify or identify images. Model generator 120 may receive or obtain data from databases 180, computing clusters 160, and/or online resources 140. For example, model generator 120 may receive a plurality of images from databases 180, online resources 140, and/or client devices 150. Alternatively, or additionally, model generator 120 may employ a web scraper to collect images of vehicles from elements of system 100. For example, model generator 120 may scrape images of vehicles from online resources 140 and/or client devices 150. In some embodiments, the images received or collected by model generator 120 may be images of vehicles. In such embodiments, model generator 120 may filter the images to eliminate images of vehicle interiors to leave only images of vehicle exteriors. Model generator 120 may label the collected or received images with metadata that identify vehicle characteristics, such as model, make or trim, but in some embodiments the images collected or received may already include identifying metadata. Model generator 120 may also receive images and metadata from image recognizer 110.

In some embodiments, model generator 120 may receive requests from image recognizer 110. As a response to the request, model generator 120 may generate one or more classification models or image identification models. Classification models may include statistical algorithms that are used to determine the likeliness between images given a set of training images. For example, classification models may be convolutional neural networks (CNNs) that determine attributes in a figure based on extracted parameters. However, identification models may also include regression models that estimate the relationships among input and output variables. Identification or classification models may additionally sort elements of a dataset using one or more classifiers to determine the probability of a specific outcome. Identification or classification models may be parametric, non-parametric, and/or semi-parametric models.

In some embodiments, classification or identification models may represent an input layer and an output layer connected via nodes with different activation functions as in a convolutional neural network. "Layers" in the neural network may transform an input variable into an output variable (e.g., holding the class scores) through a differentiable function. The CNN may include multiple distinct types of layers. For example, the network may include a convolution layer, a pooling layer, a ReLU Layer, a number filter layer, a filter shape layer, and/or a loss layer. Further, the CNN may include a plurality of nodes. The nodes may be associated with activation functions and may be connected with other nodes via synapsis that are associated with a weight. The neural networks may model input/output relationships of variables and parameters by generating a number of interconnected nodes that contain an activation function. The activation function of a node may define a resulting output of that node, given an argument or a set of arguments. Artificial neural networks may generate patterns to the network via an 'input layer,' which may communicate to one or more "hidden layers" where the system determines regressions via weighted connections. Identification and classification models may also include Random Forests, composed of a combination of decision tree predictors. (Decision trees may include data structure mapping observations about something, in the "branch" of the tree, to conclusions about that thing's target value, in the "leaves" of the tree.) Each tree may depend on the values of a random vector sampled independently and with the same distribution for all trees in the forest. Identification models may additionally or alternatively include classification and regression trees.

Model generator 120 may submit models to identify a vehicle. To generate identification models, model generator 120 may analyze images collected or received from other elements of system 100, applying machine-learning methods. Model generator 120 is further described below in connection with FIG. 3.

In some embodiments, model generator 120 may generate "patches," that is, modifications, for already developed classification or identification models. Model generator 120 may generate a patch that may include a set of changes to the identification or classification model to update, fix, or improve the model. The patch may include fixing security vulnerabilities and other bugs that cause inaccuracies. The patch generated by model generator 120 may also improve the usability or performance. For example, the patch may be directed to improving graphical user interfaces and/or correct attribute extraction processes. Patching processes are further described in connection with FIG. 12.

Image recognizer 110 may include one or more computing systems configured to perform operations consistent with performing image classification and/or identifying images. For example, image recognizer 110 may perform operations to perform image classification of vehicles based on an image captured by cameras in client devices 150. In some embodiments, image recognizer 110 may receive a request to identify an image. Image recognizer 110 may receive the request directly from client devices 150. Alternatively, image recognizer 110 may receive the request from other components of system 100. For example, client devices 150 may send requests to online resources 140, which then send requests to inventory search system 105. Requests may include images of vehicles and locations of client devices 150. Additionally, in some embodiments, requests may specify dates and preferences. In other embodiments, requests may include video files or streaming video feeds.

As a response to identification requests, inventory search system 105 may initiate identification models using model generator 120. The request may include information about the image source, for example an identification of client device 150. The request may additionally specify a location. In addition, image recognizer 110 may retrieve information from databases 180.

Image recognizer 110 may generate an identification result based on the information received from client device 150 request and transmit the information to the client device. Image recognizer 110 may generate instructions to modify a graphical user interface to include identification information associated with the received image. Image recognizer 110 is further described below in connection with FIG. 2.

Although in FIG. 1 image recognizer 110 is shown as part of inventory search system 105, in some embodiments (not shown) image recognizer 110 may be implemented by other elements of system 100. For example, image recognizer 110, or functions performed by image recognizer 110 may be performed in client devices 150. Client devices 150 may execute image recognizer 110 functions and identify images using classification or identification models.

Moreover, FIG. 1 shows image recognizer 110 and model generator 120, as different components. However, image recognizer 110 and model generator 120, may be implemented in the same computing system. For example, all elements in inventory search system 105 may be embodied in a single server. Alternatively, image recognizer 110 and model generator 120 may be located in different portions of system 100 to improve communication flows. For example, when image recognizer 110 is not implemented as part of client device 150 but a user desires to minimize latency, image recognizer 110 may be implemented in an edge server of inventory search system 105 while model generator 120, which may be accessed less frequently, may be placed in a back-end server of inventory search system 105.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s). Further, network 170 may include a network of network, coordinating communication through several networks.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
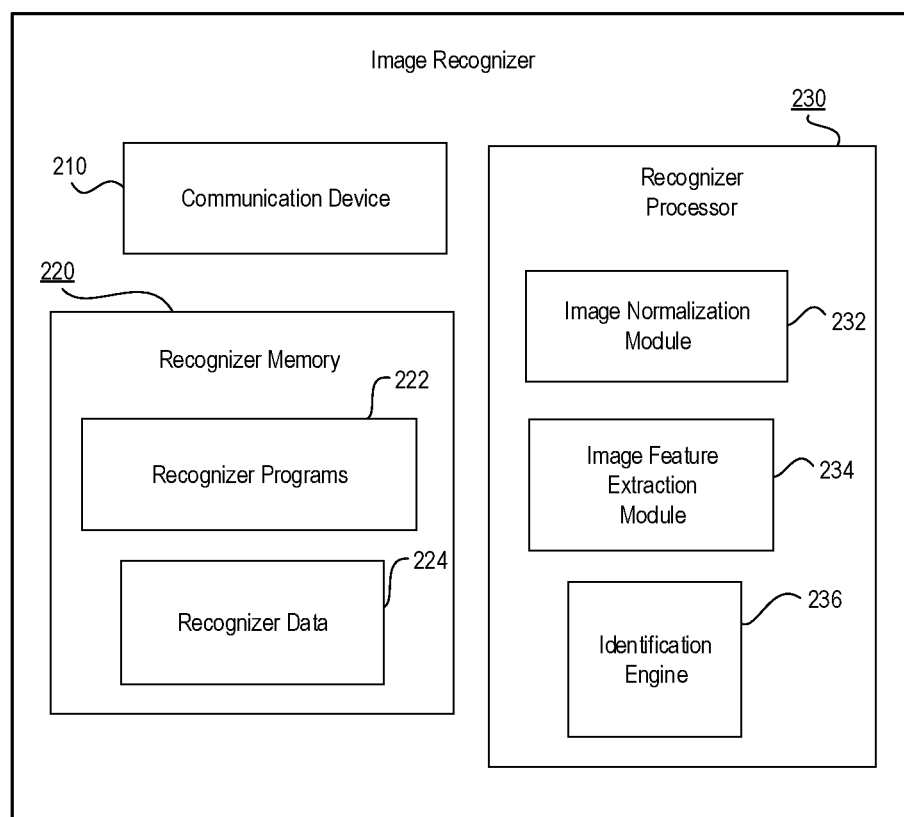
FIG. 2 is a block diagram of an exemplary image recognizer, consistent with disclosed embodiments.

FIG. 2 shows a block diagram of an exemplary image recognizer 110, consistent with disclosed embodiments. Image recognizer 110 may include a communication device 210, a recognizer memory 220, and one or more recognizer processors 230. Recognizer memory 220 may include recognizer programs 222 and recognizer data 224. Recognizer processor 230 may include an image normalization module 232, an image feature extraction module 234, and an identification engine 236.

In some embodiments, image recognizer 110 may take the form of a server, a general-purpose computer, a mainframe computer, or any combination of these components. In other embodiments, image recognizer 110 may be a virtual machine. In yet other embodiments, operations and functions described for image recognizer 110 may be implemented by client devices 150 and processing units in client devices 150. Other implementations consistent with disclosed embodiments are possible as well.

Communication device 210 may be configured to communicate with one or more databases, such as databases 180 described above, either directly, or via network 170. In particular, communication device 210 may be configured to receive from model generator 120 a model to identify vehicle attributes in an image and client images from client devices 150. In addition, communication device 210 may be configured to communicate with other components as well, including, for example, databases 180.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Recognizer memory 220 may include one or more storage devices configured to store instructions used by recognizer processor 230 to perform functions related to disclosed embodiments. For example, recognizer memory 220 may store software instructions, such as recognizer program 222, that may perform operations when executed by recognizer processor 230. The disclosed embodiments are not limited to separate programs or computers configured to perform dedicated tasks. For example, recognizer memory 220 may include a single recognizer program 222 that performs the functions of image recognizer 110, or recognizer program 222 may include multiple programs. Recognizer memory 220 may also store recognizer data 224 that is used by recognizer program(s) 222.

In certain embodiments, recognizer memory 220 may store sets of instructions for carrying out processes to identify a vehicle from an image, generate a list of identified attributes, and/or generate instructions to display a modified graphical user interface, described below in connection with FIGS. 15-20. In certain embodiments, recognizer memory 220 may store sets of instructions for identifying whether an image is acceptable for processing and generate instructions to guide the user in taking an acceptable image. Other instructions are possible as well. In general, instructions may be executed by recognizer processor 230 to perform processes consistent with disclosed embodiments.

In some embodiments, recognizer processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, recognizer processor 230 may be a plurality of devices coupled and configured to perform functions consistent with the disclosure.

In some embodiments, recognizer processor 230 may execute software to perform functions associated with each component of recognizer processor 230. In other embodiments, each component of recognizer processor 230 may be an independent device. In such embodiments, each component may be a hardware device configured to specifically process data or perform operations associated with modeling hours of operation, generating identification models and/or handling large data sets. For example, image normalization module 232 may be a field-programmable gate array (FPGA), image feature extraction module 234 may be a graphics processing unit (GPU), and identification engine 236 may be a central processing unit (CPU). Other hardware combinations are also possible. In yet other embodiments, combinations of hardware and software may be used to implement recognizer processor 230.

Image normalization module 232 may normalize a received image so it can be identified in the model. For example, communication device 210 may receive an image from client devices 150 to be identified. The image may be in a format that cannot be processed by image recognizer 110 because it is in an incompatible format or may have parameters that cannot be processed. For example, an image may be received in a specific format such as High Efficiency Image File Format (HEIC) or in a vector image format such as Computer Graphic Metafile (CGM). Then, image normalization module 232 may convert the received image to a standard format such as JPEG or TIFF. Alternatively, or additionally, the received image may have an aspect ratio that is incompatible with an identification model. For example, the image may have a 2.39:1 ratio, that may be incompatible with the identification model. Then, image normalization module 232 may convert the received image to a standard aspect ratio such as 4:3. In some embodiments, the normalization may be guided by a model image. For example, a model image stored in recognizer data 224 may be used to guide the transformations of the received image.

In some embodiments, recognizer processor 230 may implement image normalization module 232 by executing instructions to create an application in which images are received and transformed. In other embodiments, however, image normalization module 232 may be a separate hardware device or group of devices configured to carry out image operations. For example, to improve performance and speed of the image transformations, image normalization module 232 may be an SRAM-based FPGA which functions as image normalization module 232. Image normalization module 232 may have an architecture designed for implementation of specific algorithms. For example, image normalization module 232 may include a Simple Risc Computer (SRC) architecture or other reconfigurable computing system.

Image feature extraction module 234 may extract features from a received image or a normalized image. In some embodiments, features may be extracted from an image by applying a pre-trained convolutional neural network. For example, in some embodiments pre-trained networks such as Inception-v3, AlexNet, or TensorFlow may be used to automatically extract features from a target image. In such embodiments, feature extraction module 234 may import layers of a pre-trained convolutional network, determine features described in a target layer of the pre-trained convolutional network, and initialize a multiclass fitting model using the features in the target layer and images received for extraction.

In other embodiments, other deep learning models such as Fast R-CNN can be used for automatic feature extraction. In yet other embodiments processes such as histogram of oriented gradients (HOG), speeded-up robust features (SURF), local binary patterns (LBP), color histogram, or Haar wavelets may also be used to extract features from a received image. In some embodiments, image feature extraction module 234 may partition the image in a plurality of channels and a plurality of portions, such that the channels determine a histogram of image intensities, determine feature vectors from intensity levels, and identify objects in a region of interest. Image feature extraction module 234 may perform other techniques to extract features from received images.

Recognizer processor 230 may implement image feature extraction module 234 by executing software to create an environment for extracting image features. However, in other embodiments image feature extraction module 234 may include independent hardware devices with specific architectures designed to improve the efficiency of aggregation or sorting processes. For example, image feature extraction module 234 may be a GPU array configured to partition and analyze layers in parallel. Alternatively, or additionally, image feature extraction module 234 may be configured to implement a programming interface, such as Apache Spark™, and execute data structures, cluster managers, and/or distributed storage systems. For example, image feature extraction module 234 may include a resilient distributed dataset that is manipulated with a standalone software framework and/or a distributed file system.

Identification engine 236 may calculate correlations between a received image and stored attributes based on one or more identification models. For example, identification engine 236 may use a model from model generator 120 and apply inputs based on a received image or received image features to generate an attributes list associated with the received image.

Identification engine 236 may be implemented by recognizer processor 230. For example, recognizer processor 230 may execute software to create an environment to execute models from model generator 120. However, in other embodiments identification engine 236 may include hardware devices configured to carry out parallel operations. Some hardware configurations may improve the efficiency of calculations, particularly when multiple calculations are being processed in parallel. For example, identification engine 236 may include multicore processors or computer clusters to divide tasks and quickly perform calculations. In some embodiments, identification engine 236 may receive a plurality of models from model generator 120. In such embodiments, identification engine 236 may include a scheduling module. The scheduling module may receive models and assign each model to independent processors or cores. In other embodiments, identification engine 236 may be FPGA Arrays to provide greater performance and determinism.

The components of image recognizer 110 may be implemented in hardware, software, or a combination of both, as will be apparent to those skilled in the art. For example, although one or more components of image recognizer 110 may be implemented as computer processing instructions embodied in computer software, all or a portion of the functionality of image recognizer 110 may be implemented in dedicated hardware. For instance, groups of GPUs and/or FPGAs maybe used to quickly analyze data in recognizer processor 230. Further, components of image recognizer 110 may be implemented within client devices 150. For example, processors in client devices 150 may implement image normalization module 232, image feature extraction module 234, and/or identification engine 236. In such embodiments, client devices 150 may be used to generate augmented reality images that super impose icons on video feeds captured by client devices like it is further described in connection with FIG. 15.

Figure 3:
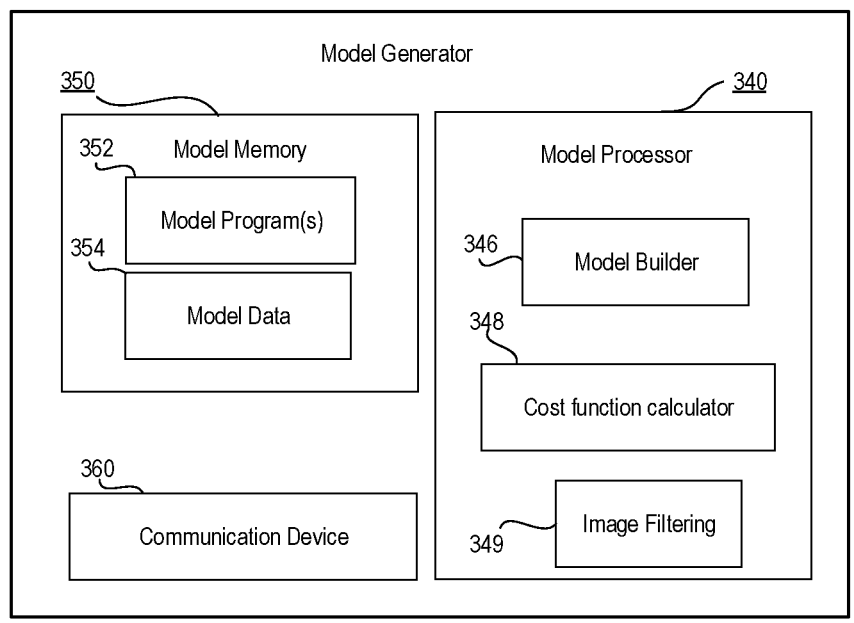
FIG. 3 is a block diagram of an exemplary model generator, consistent with disclosed embodiments.

Referring now to FIG. 3, there is shown a block diagram of an exemplary model generator, consistent with disclosed embodiments. Model generator 120 may include a model processor 340, a model memory 350, and a communication device 360.

Model processor 340 may be embodied as a processor similar to recognizer processor 230. Model processor may include a model builder 346, a cost function calculator 348, and an image filter 349.

Model builder 346 may be implemented in software or hardware configured to create identification models based on training data. In some embodiments, model builder 346 may generate CNNs. For example, model builder 346 may take a group of labeled vehicle images from databases 180 to train a CNN. In some embodiments, model builder 346 may generate nodes, synapsis between nodes, pooling layers, and activation functions, to create a vehicle identification model. Model builder 346 may calculate coefficients and hyperparameters of the convolutional neural networks based on the training data set. In such embodiments, model builder 346 may select and/or develop CNNs in a backpropagation with gradient descent. However, in other embodiments, model builder 346 may use Bayesian algorithms or clustering algorithms to generate identification models. In this context, a "cluster" is a computation operation of grouping a set of objects in such a way that objects in the same group (called a cluster) are more similar to each other than to those in other groups or clusters. In yet other embodiments, model builder 346 may use association rule mining, random forest analysis, and/or deep learning algorithms to develop models. In some embodiments, to improve the efficiency of the model generation, model builder 346 may be implemented in one or more hardware devices, such as FPGAs, configured to generate models for vehicle image identification. In some embodiments, model builder 346 may train a model using a group of labeled images for an image classification task (e.g., images of vehicles including make/model information).

Cost function calculator 348 may be implemented in software or hardware configured to evaluate the accuracy of a model. For example, cost function calculator 348 may estimate the accuracy of a model, generated by model builder 346, by using a validation dataset. In some embodiments, the validation data set may be a portion of a training data set that was not used to generate the identification model. Alternatively, or additionally, validation datasets may be built from user feedback that may include images and metadata with vehicle information as further described in connection with FIG. 12. Cost function calculator 348 may generate error rates for the identification models and may additionally assign weight coefficients to models based on the estimated accuracy.

Image filter 349 may be implemented in software or hardware configured to generate additional images to enhance the training data set used by model builder 346. One challenge in implementing portable identification systems using CNNs is the lack of uniformity in the images received from mobile devices. This problem is particularly exacerbated for augmented reality applications that have images in multiple angles, with varying contrast, and in movement. To enhance accuracy and prevent sending error messages requesting the user to take and send new images, image filter 349 may generate additional images based on images received from databases 180 and/or client devices 150. For example, image filter 349 may take an image and apply rotation, flipping, or shear filters to generate new images that can be used to train the convolutional neural network. These additional images may improve the accuracy of the identification model, particularly in augmented reality applications, in which the images may be tilted or flipped as the user of client devices 150 takes images.

Model memory 350 may include one or more storage devices configured to store instructions used by model processor 340 to perform operations related to disclosed embodiments. For example, model memory 350 may store software instructions, such as model program 352, that may perform operations when executed by model processor 340. In addition, model memory 350 may include model data 354, which may include images to train a convolutional neural network.

In certain embodiments, Model memory 350 may store sets of instructions for carrying out processes to generate a model that identifies attributes of a vehicle, described below in connection with FIG. 11.

Figure 4:
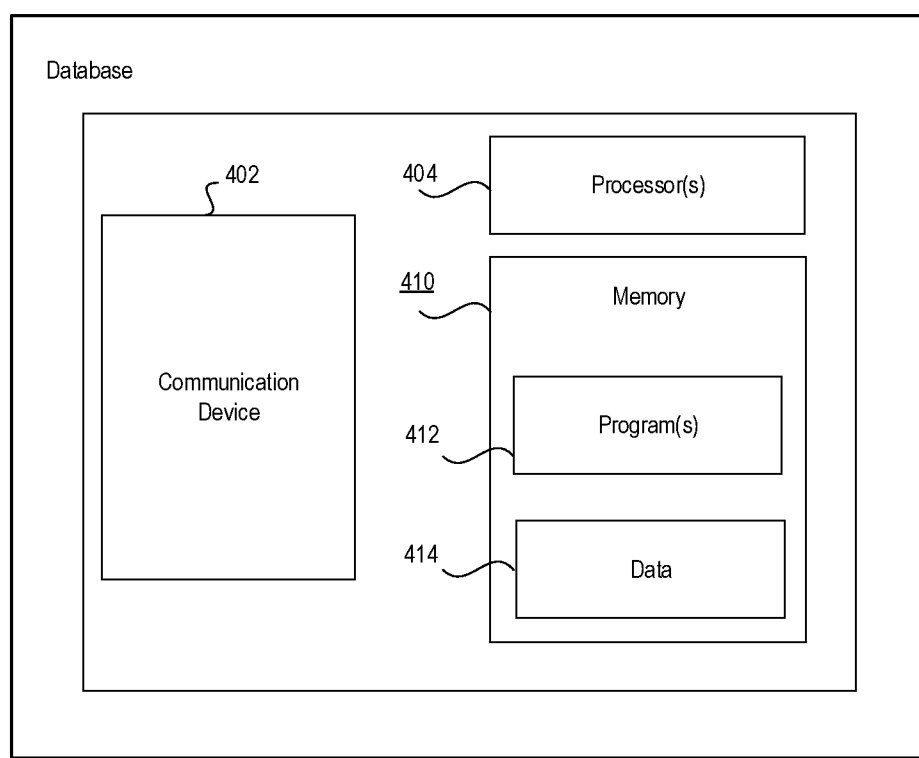
FIG. 4 is a block diagram of an exemplary database, consistent with disclosed embodiments.

Referring now to FIG. 4, there is shown a block diagram of an exemplary database 180 (FIG. 1), consistent with disclosed embodiments. Database 180 may include a communication device 402, one or more database processors 404, and database memory 410 including one or more database programs 412 and data 414.

In some embodiments, databases 180 may take the form of servers, general-purpose computers, mainframe computers, or any combination of these components. Other implementations consistent with disclosed embodiments are possible as well.

Communication device 402 may be configured to communicate with one or more components of system 100, such as online resource 140, inventory search system 105, model generator 120, image recognizer 110, and/or client devices 150. In particular, communication device 402 may be configured to provide to model generator 120 images of vehicles that may be used to generate a CNN, an image classification model, an image parameter extraction model, and/or an image identification model.

Communication device 402 may be configured to communicate with other components as well, including, for example, model memory 352 (FIG. 3). Communication device 402 may take any of the forms described above for communication device 210 (FIG. 2).

Database processors 404, database memory 410, database programs 412, and data 414 may take any of the forms described above for recognizer processors 230, memory 220, recognizer programs 222, and recognizer data 224, respectively, in connection with FIG. 2. The components of databases 180 may be implemented in hardware, software, or a combination of both hardware and software. For example, although one or more components of databases 180 may be implemented as computer processing instruction modules, all or a portion of the functionality of databases 180 may be implemented instead in dedicated electronics hardware.

Data 414 may be data associated with websites, such as online resources 140. Data 414 may include, for example, information relating to websites of automobile dealers and/or automobile manufacturers. Data 414 may include images of automobiles and information relating to automobiles, such as cost, condition, and dealers offering the automobile for sale.

Figure 5:
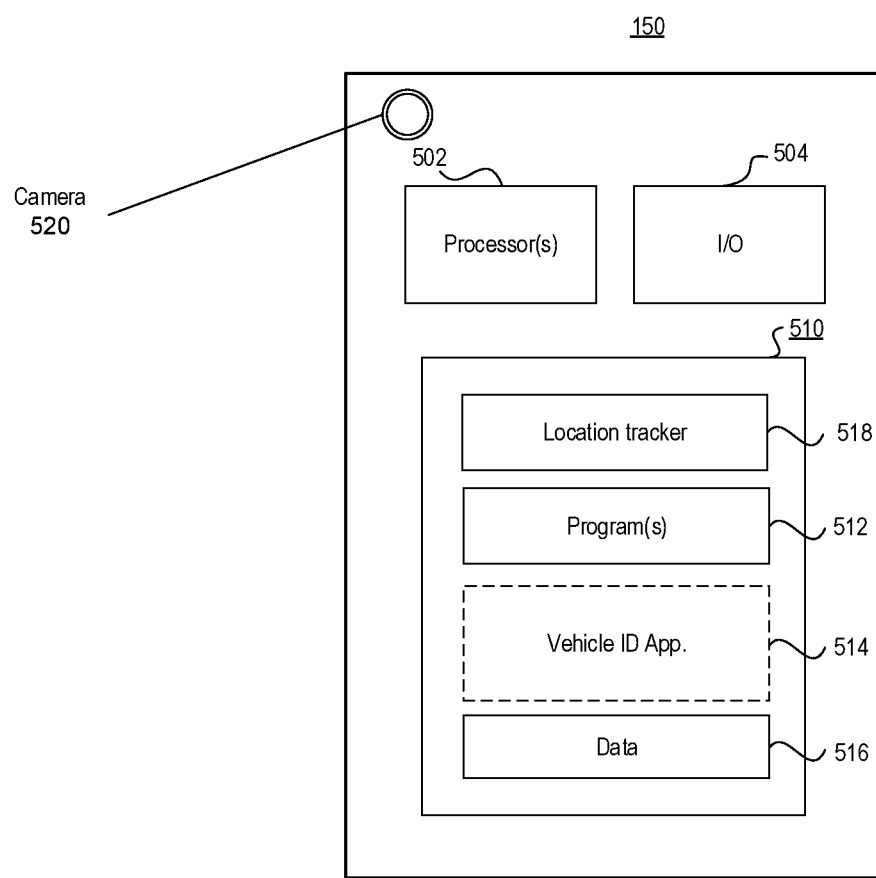
FIG. 5 is a block diagram of an exemplary client device, consistent with disclosed embodiments.

Referring now to FIG. 5, there is shown a block diagram of an exemplary client device 150 (FIG. 1), consistent with disclosed embodiments. In one embodiment, client devices 150 may include one or more processors 502, one or more input/output (I/O) devices 504, and one or more memories 510. In some embodiments, client devices 150 may take the form of mobile computing devices such as smartphones or tablets, general-purpose computers, or any combination of these components. Further, client devices 150 may take the form of wearable devices, such as smart glasses or smartwatches. Alternatively, client devices 150 (or systems including client devices 150) may be configured as a particular apparatus, embedded systems, dedicated circuit, and the like based on the storage, execution, and/or implementation of the software instructions that perform one or more operations consistent with the disclosed embodiments. According to some embodiments, client devices 150 may include web browsers or similar computing devices that access web site consistent with disclosed embodiments.

Processor 502 may include one or more known processing devices, such as mobile device microprocessors manufactured by Intel™, NVIDIA™, or various processors from other manufacturers. The disclosed embodiments are not limited to any specific type of processor configured in client devices 150.

Memory 510 may include one or more storage devices configured to store instructions used by processor 502 to perform functions related to disclosed embodiments. For example, memory 510 may be configured with one or more software instructions, such as programs 512 that may perform operations when executed by processor 502. The disclosed embodiments are not limited to separate programs or computers configured to perform dedicated tasks. For example, memory 510 may include a single program 512 that performs the functions of the client devices 150, or program 512 may include multiple programs. Memory 510 may also store data 516 that is used by one or more programs 312 (FIG. 3).

Memory 510 may include instructions to perform image classification and/or generate graphical user interfaces. For example, memory 510 may store instructions that configure processor 502 to perform image classification operations, like extracting attributes from images, searching other images with similar attributes, and generating GUIs to display image classification results. Memory 510 may also include instructions to generate intermediate GUIs after receiving a search query and may include instructions to generate and modify the dynamic GUIs. For example, memory 510 may include instructions to generate GUIs with interactive icons and the functions or operations of the interactive icons may be stored in memory 510.

In certain embodiments, memory 510 may store a vehicle identification application 514 that may be executed by processor(s) 502 to perform one or more image identification processes consistent with disclosed embodiments. In certain aspects, vehicle identification application 514, or another software component, may be configured to generate and transmit request for servers to perform vehicle identification tasks. For example, vehicle identification application 514 may store CNN operations and look-up tables that correlate identified attributes with available vehicles. Further vehicle identification application 514 may include metafiles with information about vehicles, inventory status, and their related attributes. Moreover, vehicle identification application 514 may be modifiable or updatable with patches received from other elements of system 100. For example, when inventory search system 105 issues a patch for a classification or identification model, vehicle identification application 514 may run the patch to update identification models. In addition, vehicle identification application 514 may perform operations of generating augmented reality icons to modify video streams captured by client devices 150. Moreover, vehicle identification application 514 may also include instructions to generate intermediary graphical user interfaces after performing preliminary searches of an image, as further described in connection to FIGS. 16-17.

Vehicle identification application 514 may also configure processor(s) 502 to communicate with inventory search system 105 or determine the location of client devices 150. For instance, through vehicle identification application 514, client devices 150 may communicate feedback of inaccurate results to inventory search system 105. For example, vehicle identification application 514 may generate HTTP requests or other TCP/IP packets directed to inventory search system 105 with user information. Alternatively, or additionally, vehicle identification application 514 may generate queries for inventory search system 105 based on attributes identified from an image, filters or options selected by a user, and locations of client devices. In such embodiments, vehicle identification application 514 may also include instructions that configure processor(s) 502 to generate graphical user interfaces based on responses or communications from other elements of system 100. For example, vehicle identification application 514 may include instructions to generate GUIs based on results obtained from servers. Further, vehicle identification application 514 may store classification or identification models. For example, vehicle identification application 514 may store the models generated by model generator 120 (FIG. 3).

Additionally, vehicle identification application 514 may store instructions to compress or decompress images. In some embodiments, results images may be exchanged between client devices 150 and other elements of system 100. For example, when transmitting feedback for a classification model, client devices 150 may send an image with metadata to inventory search system 105. Further, when communicating results for an image classification, inventory search system 105 may send a plurality of images to client devices 150 including financing information and availability in inventories. When there are limited bandwidths for network 170, like in cellular networks, images exchanges may be expensive or slow. To improve the system vehicle identification application 514 may perform compression and decompression of images to reduce the size of files being exchanged over the network.

For example, vehicle identification application 514 may configure processor(s) 502 to perform lossless image compression such as run-length encoding, area image compression, DPCM and predictive coding, entropy encoding, adaptive dictionary algorithms (such as LZW), DEFLATE, or chain codes. Alternatively, or additionally, vehicle identification application 514 may perform lossy compression/decompression methods such as reducing the color space, chroma subsampling, transform coding, and/or fractal compression.

Further, in some embodiments, vehicle identification application 514 may perform image compression specifically for vehicle images. For example, in some embodiments instead of transmitting or receiving the full image through the network, vehicle identification application 514 may transmit or receive only key features of the image such as make, model, trim, and/or color. Based on attribute information, vehicle identification application 514 may retrieve a sample image and make modifications to generate images. For instance, inventory search system 105 identified vehicles of make Toyota™, from 2010, with different colors. Instead, of sending multiple images of Toyotas from 2010 with multiple colors, inventory search system 105 may transmit the attributes information (i.e., make, model, and colors). Based on such information, vehicle identification application 514 may retrieve a sample image of a Toyota from 2010 and make modifications to the sample image to generate images with the colors identified by inventory search system 105. For example, vehicle identification application 514 may generate a plurality of thumbnails with the different colors. Such arrangement of sending only attributes may reduce network congestion.

In embodiments where vehicle identification application 514 may generate thumbnail images for graphical user interfaces in client devices 150, vehicle identification application 514 may store instructions for processor(s) 502 such as: <src="/folder_name/image_file_name.jpg?Action=thumbnail&Width=80&Height=80" I> <src="/folder_name/image_file_name.jpg?Action=thumbnail&Width=80&Height=80&alg orithm=fill_proportional" I> <src="/folder_name/image_file_name.jpg?Action=thumbnail&Width=80&Height=80&For mat=png" I> <src="{tag_myimage_ value}?Action=thumbnail&Width=80&Height=80" I> <img src="{tag_largeimage_path}?Action=thumbnail&Width=50&Height=50" I> to generate thumbnail images with different characteristics based on results from image recognition and/or information received from inventory search system 105.

Moreover, vehicle identification application 514 may be configured to feed an image to the model, for example to a model trained by model builder 346 (FIG. 3). Then, vehicle identification application 514 may receive classification results with a confidence score for all the classes it was trained. In some embodiments, the model may be trained to recognize 600 make/models and may normalize results, so the confidence values add up to 1.0. Vehicle identification application 514 may then select the class with the highest confidence score (or possibly the top few) and show them to the user of client devices 150. As further described below in connection with FIGS. 16-17, a user may keep or change that selection before conducting an inventory search. Further, vehicle identification application 514 may take in the selections of filtering options to narrow the inventory search.

I/O devices 504 may include one or more devices configured to allow data to be received and/or transmitted by client devices 150 and to allow client devices 150 to communicate with other machines and devices, such as other components of system 100. For example, I/O devices 504 may include a screen for displaying optical payment methods such as Quick Response Codes (QR), or providing information to the user. I/O devices 504 may also include components for NFC communication. I/O devices 504 may also include one or more digital and/or analog devices that allow a user to interact with client devices 150 such as a touch-sensitive area, buttons, or microphones. I/O devices 504 may also include one or more accelerometers to detect the orientation and inertia of client devices 150. I/O devices 504 may also include other components known in the art for interacting with inventory search system 105.

In some embodiments, client devices 150 may include a camera 520 that is configured to take still images or video and send it to other components of system 100 via, for example, network 170.

The components of client devices 150 may be implemented in hardware, software, or a combination of both hardware and software.

Figure 6:
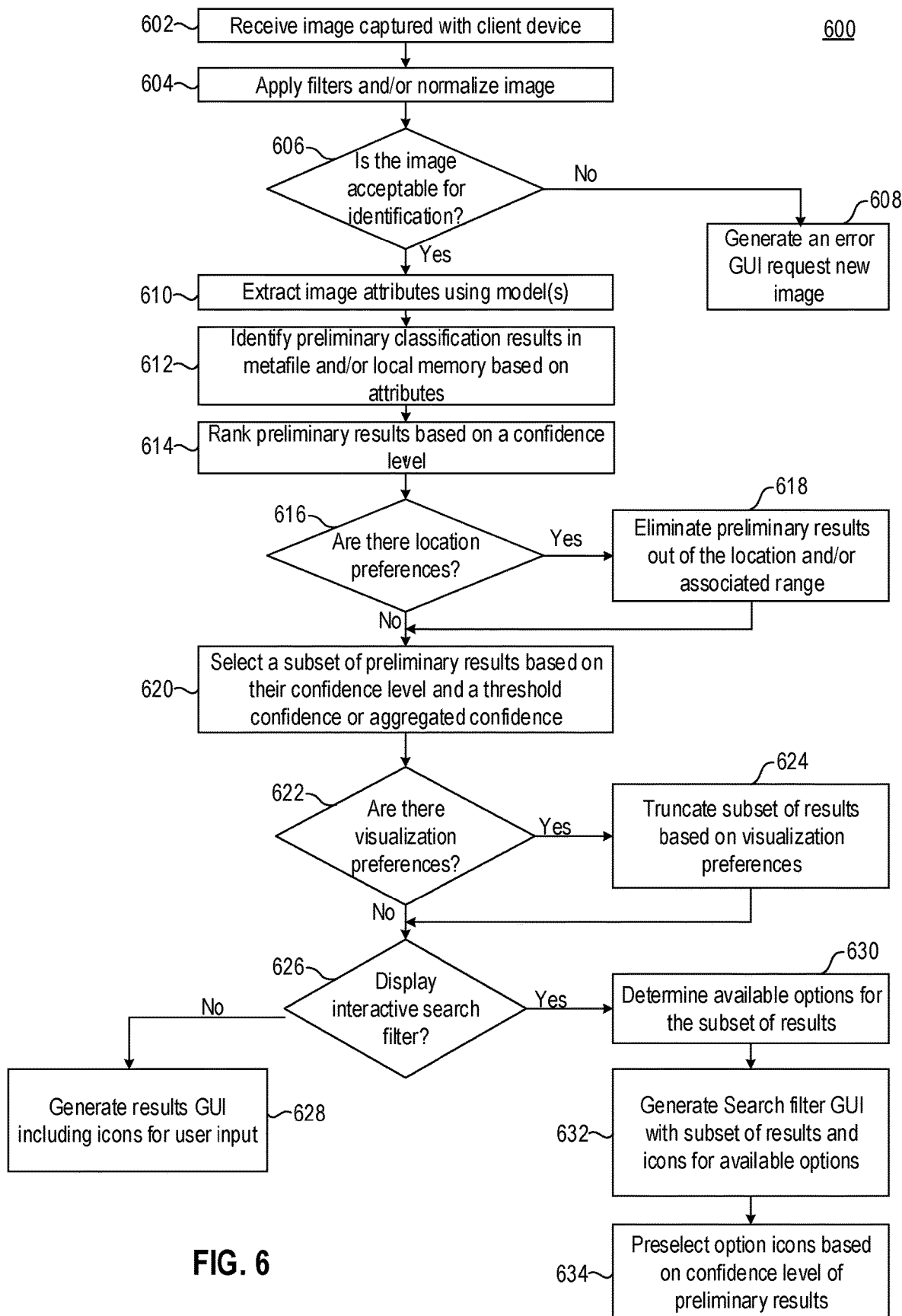
FIG. 6 is a flow chart illustrating an exemplary process for the generation of graphical user interfaces, consistent with disclosed embodiments.

Referring now to FIG. 6, there is shown a flow chart illustrating an exemplary process 600 for the generation of graphical user interfaces, consistent with disclosed embodiments. In some embodiments, process 600 may be executed by inventory search system 105. For example, image recognizer 110 may perform steps in process 600, generate GUIs, and communicate them to client devices 150. In other embodiments, however, process 600 may be performed by client devices 150. For example, processor(s) 502 in client devices 150 may execute instructions in vehicle identification application 514 (FIG. 5) to perform process 600 and generate graphical user interfaces for displays in client devices 150. Further, as previously discussed in connection to FIG. 1, in some embodiments process 600 may be performed by multiple elements of system 100. For example, some steps of process 600 may be performed by inventory search system 105, while other steps of process 600 may be performed by client devices 150.

The description below of steps in process 600 illustrates an embodiment in which inventory search system 105 performs steps of process 600. However, as previously discussed other elements of system 100 may also be configurable to perform one or more of the steps in process 600. For example, client devices, and in particular processor(s) 502 may perform one or more steps of process 600.

Figure 15:
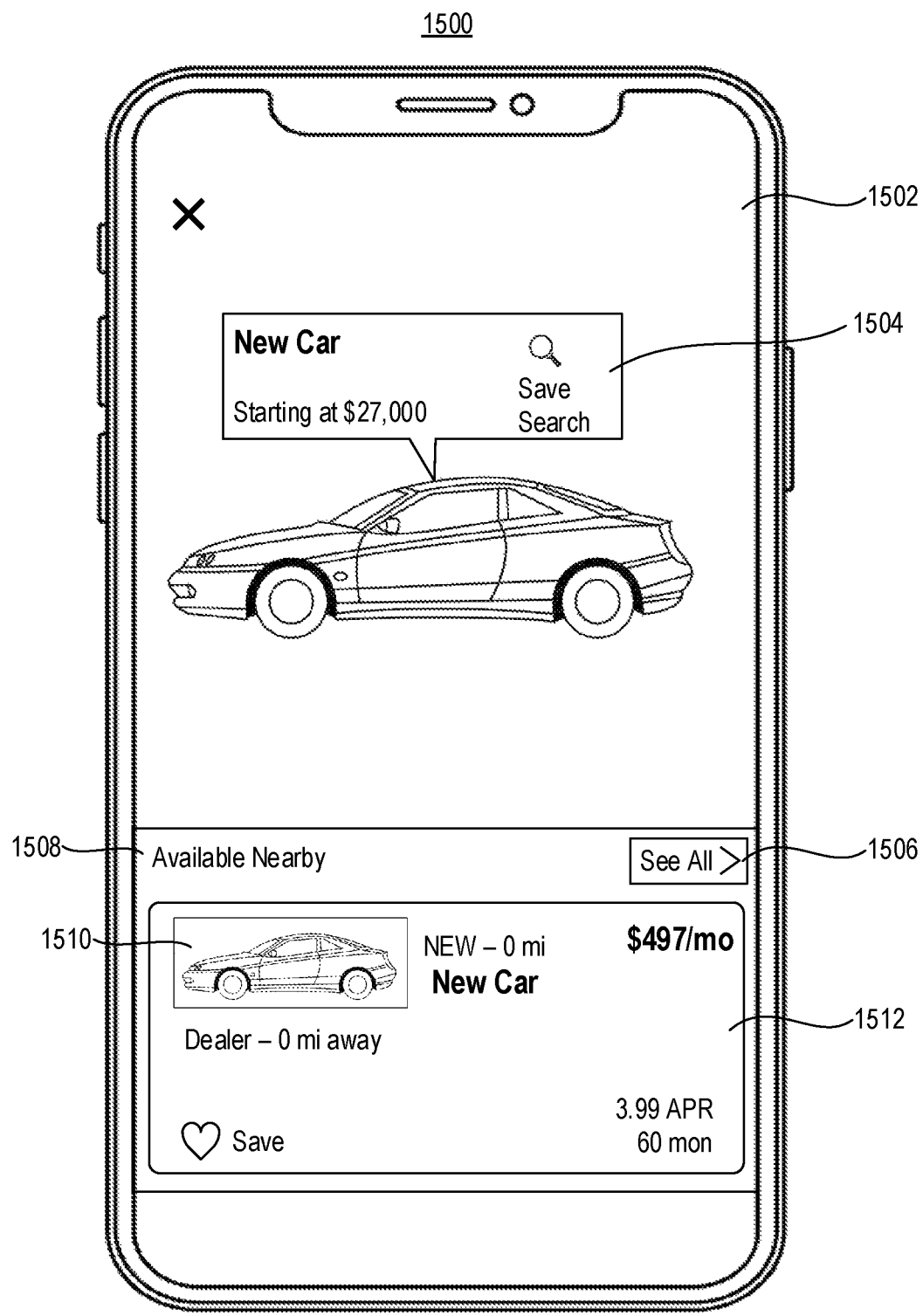
FIG. 15 is an exemplary first graphical user interface, according with disclosed embodiments.

In step 602, inventory search system 105 may receive a captured image. The captured image may be captured by, for example, camera 520 in client devices 150. The captured image may be captured from a video stream or video feed. For example, the captured image may be an image that is being observed in a client device 150 running an augmented reality application, such as vehicle identification application 514. In some embodiments, the image may be an image of a vehicle, as shown in FIG. 15.

In some embodiments, the image received in step 602 may have a specific image format and in step 602, inventory search system 105 may determine a file type of received image data. For example, inventory search system 105 may identify that the received image is in JPEG format. Alternatively, inventory search system 105 may identify the image data is a raster format, such as GIF or TIFF. Also, inventory search system 105 may be configured to determine the image data is in a vector format such as CGM or XPS. In yet other embodiments, identification system may determine the image data is in a proprietary image format such as HEIC.

In step 604, inventory search system 105 may apply filters and/or normalize image in preparation for extraction of parameters and image classification. For example, in step 604, inventory search system 105 may convert the format of the received image data from the determined file type to a model file type. In some embodiments, converting the received image data to a new format may include executing a scripting function, such as the following, where MODEL is the model format:
 import Image;
 im=Image.open('test.jpg');
 im.save('test.MODEL') # or 'test. MODEL';

Further, in step 604, inventory search system 105 may apply operations to normalize the received image. For example, inventory search system 105 may resize the received image data, blur, crop, despeckle, dither, draw on, flip, join, and re-sample based on the parameters of the model image.

Additionally, or alternatively, in some embodiments, in step 604, inventory search system 105 may normalize the image based on normalization rules and determine a plurality of attributes from the normalized image by extracting the attributes from the normalized image using a pretrained convolution neural network.

In step 606, inventory search system 105 may determine whether the filtered and/or normalized image is acceptable for image classification or identification. For example, after the normalization process the contrast of the image may be poor. Because the transformation process of step 604 has degraded the quality of the image, the image data may not be acceptable for identification or image classification. Thus, if the normalized image data is not acceptable (step 606: No), inventory search system 105 may generate an error GUI in step 606. For example, inventory search system 105 may generate an error GUI as further disclosed in connection with FIG. 20. Alternatively, in other embodiments, when an error message is generated in step 606, inventory search system 105 may generate a computer image that is superimposed on client device 150 notifying of the error with an augmented reality application.

However, if the filtered or normalized image data is acceptable for identification (step 606: yes), inventory search system 105 may continue to step 610 and extract image attributes using classification or identification models.

In step 610, inventory search system 105 may use a neural network model or other machine learning model to extract image parameters or attributes from the received image. For example, in step 610, inventory search system 105 may import layers of a pre-trained convolutional neural network, determine features described in a target layer of the pre-trained network, and initialize a multi-class fitting model using the features in the target layer. In such embodiments, inventory search system 105 may extract features of the captured image using a convolutional neural network with max pooling layers, and mean, max, and L2 norm layers to compute extracted parameters. Additionally, inventory search system 105 may generate a file with the features it identified from the image. In some embodiments, in which the capture image is an image of a vehicle, the identified attributes or features may include vehicle make, vehicle model, and/or vehicle trim. Alternatively, or additionally, in step 610 inventory search system 105 may get Histogram of Oriented Gradient (HOG) features for different images and feed those to a Logistic Regression or Support Vector Machine and train them to classify the images and obtain preliminary results. Further, the identified attributes or features may include vehicle make, vehicle model, vehicle body style, vehicle year, vehicle color, and/or vehicle trim.

Furthermore, inventory search system 105 may extract image attributes using techniques as compiled functions that feed-forward data into an architecture to the layer of interest in the neural network. For instance, inventory search system 105 may implement the following script for generating activations for a dense layer, determine image parameters, and extract image attributes:
 dense_layer=layers.get_output(net1.layers['dense'], deterministic=True);
 output_layer=layers.get_output(net1.layers['output'], deterministic=True);
 input_var=net1.layers_['input'].input_var;
 f_output=t.function([input_var], output_layer);
 f_dense=t.function([input_var], dense_layer).

In other embodiments, inventory search system 105 may implement engineered feature extraction methods in step 610. For example, inventory search system 105 may perform a scale-invariant feature transform, Vector of Locally Aggregated Descriptors (VLAD) encoding, or extractHOGFeatures, among others to extract attributes from the image.

In step 612, inventory search system 105 may perform a preliminary search in a metafile using the extracted attributes as the search parameters. The metafile may include a file format that stores multiple types of data such as graphics, text, or vector file formats. The metafile may provide support for an operating system's computer graphics. The metafile used or accessed in step 612 may include formats such as (WMF) Windows Metafile=(EMF) Enhanced Metafile, (EPS) Encapsulated PostScript, and (CGM) Computer Graphics Metafile. In some embodiments, the metafile may be stored in a local memory. For example, when process 600 is being executed by image recognizer 110, the metafile accessed in step 612 for preliminary searches may be stored in recognizer memory 220 (FIG. 2). However, in embodiments in which process 600 is performed by client devices, the metafile may be stored in memory 510 (FIG. 5). Alternatively, or additionally, metafile or look-up tables for preliminary searches in step 612 may be stored in memories of fast access or minimum latency. For example, metafile or look-up tables for preliminary searches may be stored in local RAM memories or in edge servers that can quickly respond to client devices 150 queries.

In step 614, inventory search system 105 may rank preliminary results based on a confidence level. Similar to keyword searches, image classification may also have results that are more relevant based on their relatedness with the sample image. In step 614, inventory search system 105 may classify results from the preliminary search of step 612 based on their relevance or confidence level. For example, models used for image classification or extraction may have different prediction accuracies. In step 614, inventory search system 105 may incorporate a weighting for the preliminary results based on the identification or classification model performance for the attributes extracted from the image or the number of results that were obtained with the preliminary search. In some embodiments, the confidence level may be a percentage of accuracy or certainty. For example, the confidence level may be a prediction confidence percentage. When the prediction confidence for the image classification is high (e.g., all attributes extracted from the image are present in the result image and there are no overlapping classification groups) the confidence level may be high and have a related score of 90%. However, if the prediction confidence for the image classification is low (e.g., only a few attributes were found in the result image and there are other classification groups that also share the same attributes) the confidence level may be low and have a related score of only 10%.

In some embodiments, the confidence levels determine in step 614 may be configured as a probability function. In such embodiments, the confidence levels of results from the search in step 612 may add to 100% (or 1), complying with definitions of probability function. However, in other embodiments, the confidence level may be unrelated from probabilities and may be determined with a weighted scored.

In step 616, inventory search system 105 may determine whether the image classification is limited by location preferences. For example, when the image classification is being processed in client devices 150 or is received from a specific location, inventory search system 105 may tailor results from the image classification based on a location of client devices 150 and a range. For example, inventory search system 105 may determine to focus results that are available within a 5-mile radius from the location of client devices 150. Thus, in some embodiments, ranking of preliminary results may include determinations of distance with respect to client devices 150. For example, inventory search system 105 may determine a maximum distance for the plurality of first results based on a preference stored in the one or more storage devices and eliminate a result from the first results associated with a location outside the maximum distance from the location of the client device. Further, in step 616 inventory search system 105 may cross-reference with a list of available make/models in the area (or perform an inventory search in the background) and remove model prediction results absent from that list. This may prevent the user getting an empty search later.

Further, inventory search system 105 may determine location preferences based on user records. For example, a user doing vehicle image classification may prefer certain dealers or may prefer certain areas to limit the search. In such embodiments, inventory search system 105 may determine that there are location preferences (step 616: Yes) and continue to step 618 to eliminate preliminary results (from step 612) that are out of the location or the preferred range. This reduction of results may improve user experience by displaying only relevant results in screens that may have limited space in client devices 150. However, if there are no location preferences (step 616: No), for example the image classification is not related to any location of client devices 150 or the user has indicated that he does not want to restrict the image classification, inventory search system 105 may skip step 618 and continue directly to step 620.

In step 620, inventory search system 105 may select a subset of the preliminary results (from step 612) based on their confidence score and level and a threshold confidence or an aggregated confidence. For example, in step 620, inventory search system 105 may select a result subset with preliminary results that have a confidence level above 80%. Then, the subset of results would be limited to results with confidence level above 80%, having results that are highly relevant for the user search. Alternatively, or additionally, the subset of results may be selected based on combined confidence levels. In such embodiments, inventory search system 105 may add preliminary results in the subset until achieving a target combined confidence level. For example, if the combined confidence level is 90%, inventory search system 105 may add results to the subset that have confidence levels of 50%, 20%, 10%, 5%, and 5%. While none of the individual results have a high confidence level, when combined, the five results have established a high confidence that the image results are relevant for the user. Later, the user may quickly review the subset of images to identify relevant results. Generating the subset of results from the preliminary image classification is further discussed in connection with FIG. 13.

In step 622, inventory search system 105 may determine if there are visualization preferences that affect how the results should be presented. The visualization preferences may include parameters for GUIs displayed in client devices 150. For example, the visualization preferences may include number of preliminary results that should be presented, size of icons in GUI, type of interactions that the icons have, whether classification results are presented with thumbnail images or only text results. Further, the visualization preferences may include preferences of the format of the display. For example, the visualization preferences may specify whether results should be presented in a list, in a mosaic, or in a map. For example, the visualization preferences may specify that results should be presented in a list with thumbnails. Alternatively, or additionally, the visualization preferences may specific results should be presented in an image carousel.

If in step 622 inventory search system 105 determines there are visualization preferences (step 622: Yes), inventory search system 105 may truncate the subset of results selected in step 620 based on the visualization preferences. For example, if the visualization preferences indicate that only 5 results should be displayed to the user, inventory search system 105 may remove results to meet the visualization preferences. Alternatively, if the visualization preferences indicate that more results should be displayed for the user (e.g., a user wants to see all results available) in step 624 inventory search system 105 may add additional results based on the visualization preferences. Further, in some embodiments, inventory search system 105 may default select preliminary results based on the confidence level for default selecting results displayed in the graphical user interface. However, if inventory search system 105 determines there are no visualization preferences (step 622: No) inventory search system 105 may skip step 624 and continue to step 626.

In step 626, inventory search system 105 may determine whether an interactive search filter should be displayed. The interactive search filter may display options for filtering image classification results. For example, the interactive filter may include colors, sizes, or shapes that should be included or filtered out form the results of step 612. Inventory search system 105 may determine if the search filter should be displayed by retrieving user preferences for client devices to determine if a user has opted in viewing a filter for image classification. In embodiments where process 600 is being performed by inventory search system 105, inventory search system 105 may retrieve user information from, for example, databases 180 (FIG. 1) to determine if an interactive search filter should be displayed for an image classification. Alternatively, when client devices 150 perform process 600, processor(s) 502 may retrieve user preferences or information form memory 510—for example from vehicle identification application 514—to determine if the interactive image classification filter should be displayed.

When determining an interactive search filter should not be displayed (step 626: No), inventory search system 105 may continue to step 628 and generate a GUI with results for the searched image. The GUI may include icons for user selection or input. For example, in step 628, inventory search system 105 may generate thumbnails for classification results in the subset to display a user the image classification results. Further, the GUI generated in step 628 may include information about the results or the search attributes. As further described in connection to FIG. 15, the GUI may include additional information about classification results such as price or locations.

In some embodiments, the GUI generated in step 628 may be tailored for augmented reality applications. For example, when client devices 150 are running an augmented reality application and the captured image is an image from a video feed in the augmented reality application, the GUI of step 628 may be a modified image from the video feed that includes information about the classification results. For example, as further discussed in connection to FIG. 15, in step 628 a video feed may be modified to overlay icons that include information of the classification results or the subset of results. Alternatively, or additionally, the GUI generated in step 628 may include augmented reality GUI's that display information about the identified vehicle but also include banners, lists, or carousel images, with classification results.

In some embodiments, the GUI in step 628 may display identified attributes of the image on the screen of client devices 150. The images may be modified to display information such as price for the identified vehicle given the identified attributes. In other embodiments, however, inventory search system 105 may generate GUIs displaying cost and condition information in online resources 140. For example, inventory search system 105 may display information typically found for vehicles in websites such as Kelly Blue Book® and dealer or automobile manufacturer information. Further, in step 628 client devices may display icons defined by thumbnail images of vehicles matching the attributes identified in step 610.

However, if in step 626 inventory search system 105 determines an interactive search filter should be displayed (step 626: Yes), inventory search system 105 may continue to step 630. In step 630 instead of generating graphical user interfaces for augmented reality or modifying video feeds to include results information, inventory search system 105 may determine available options of the subset of results. For example, when the image classification is for a vehicle classification, inventory search system 105 may determine which types of colors, trim, and/or features are available for vehicles present in the subset with the selected preliminary results.

Figure 16:
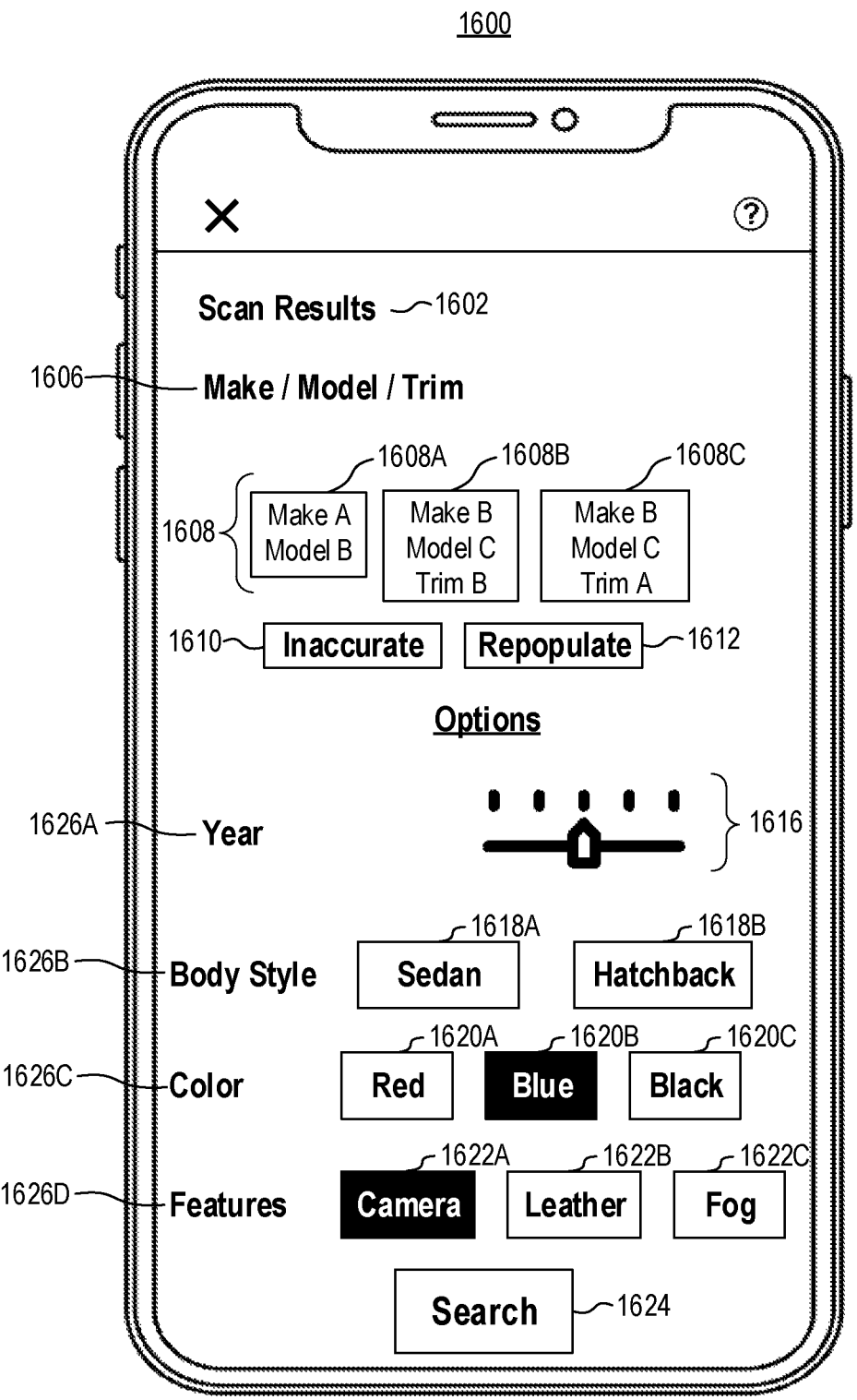
FIG. 16 is an exemplary second graphical user interface showing preliminary results and filter options, according with disclosed embodiments.

In step 632, inventory search system 105 may generate a search filter graphical user interface that displays interactive icons for the available options determined in step 630. For example, if there are multiple colors or trims from the vehicles in the subset of results, inventory search system 105 may generate a GUI with interactive icons that display different results and icons that the user may select to filter out (or select in as preference) certain features for a second search. The GUI with search filter is further disclosed in connection to FIG. 16. In some embodiments, as shown in FIG. 16, the options or icons displayed in the search filter GUI may include body style icons, color icons, and feature icons. Further, the icons may include a slider selector for selecting a vehicle year. Moreover, in some embodiments interactive icons in the search filter GUI may be arranged based on the probability score associated with corresponding first results.

In some embodiments, inventory search system 105 may continue top step 634 and preselect certain filter icons in the GUI with search filter. The preselection may be based on confidence levels in the results in the subset. For example, inventory search system 105 may determine a preselected group of options based on the attributes and preselect filter icons in the first graphical user interface corresponding to the preselected group of options. Moreover, inventory search system 105 may perform operations so at least one of the filter icons is preselected based on the plurality of attributes and the at least one preselected icon is displayed in a different color than other filter icons in the first graphical user interface.

Alternatively, or additionally, the preselection may be based on user, location, or visualization preferences. Further, as further discussed in connection to FIG. 16, in some embodiments preselected icons may have a different appearance. Moreover, in some embodiments, inventory search system 105 or client devices may determine a group of available options based on the first results and limit the display of filter or filter icons to only the group of available options for the selected first results.

Figure 7:
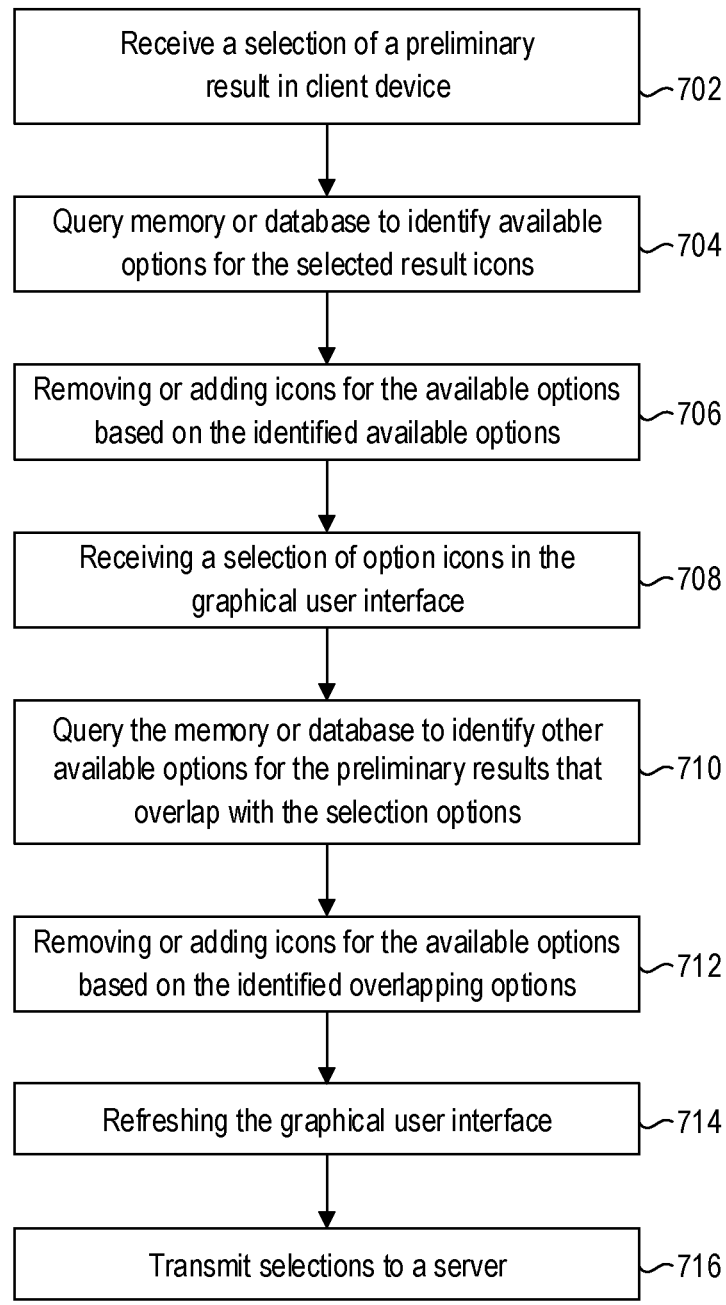
FIG. 7 is a flow chart illustrating an exemplary process for modifying graphical user interfaces, consistent with disclosed embodiments.

Referring now to FIG. 7, there is shown a flow chart of an exemplary process for modifying graphical user interfaces, consistent with disclosed embodiments. In some embodiments, as described below, process 700 may be executed by inventory search system 105. For example, image recognizer 110 may perform steps in process 700, generate instructions to modify GUIs, and communicate them to client devices 150. In other embodiments, however, process 700 may be performed by client devices 150. For example, processor(s) 502 in client devices 150 may execute instructions in vehicle identification application 514 (FIG. 5) to perform process 700 and modify GUIs that are being displayed in client devices 150. Further, in some embodiments process 700 may be performed by multiple elements of system 100. For example, some steps of process 700 may be performed by inventory search system 105, while other steps of process 700 may be performed by client devices 150.

In step 702, inventory search system 105 (FIG. 1) may receive a selection of a preliminary result in client devices 150. For example, inventory search system 105 may receive an indication that a user of client devices 150 received a selection in the GUI that was generated in processed 600 (FIG. 6) and presented to a user in steps 632 or 628. In such embodiments, receiving a selection of preliminary result may include receiving a selection of an interactive icon associated with a preliminary result (i.e., a result icon), which display a thumbnail for preliminary results.

In step 704, inventory search system 105 may query a memory or a database to identify available options for the selected preliminary result. In some embodiments, inventory search system 105 may query local memories to identify which options are available for the selected preliminary icon. For example, inventory search system 105 may present a GUI with 3 results icons after process 600. The result icons may include a BMW® and a Mercedes Benz®. From these preliminary results, inventory search system 105 may receive the selection of a BMW in step 702. Thus, in step 704 inventory search system 105 may determine options available for BMW. Inventory search system 105 may determine, for example, that there are BMW available in red, black, and white, and models 2018, 2019, and 2020. In some embodiments, inventory search system 105 may perform the query of step 704 with a local memory, to minimize latency and provide a smooth user experience with minimum lag. For example, when process 700 is performed by client devices 150, client devices 150 may perform step 704 by querying memory 510 directly. In such embodiments, memory 510 may be updated periodically to keep up to date inventories and available options.

In step 706, inventory search system 105 may remove or add icons for the available options based on the identified available options in step 704. Continuing with the previous example of a BMW selection, because the available options are colors red, black, and white, and models 2018, 2019, and 2020, in step 706 inventory search system 105 may remove icons for colors blue and green from GUIs presented to client devices 150. These other options are not available for the selected preliminary results and in order to improve user experience and reduce the number of elements in the displays of client devices 150, which may be small, inventory search system 105 may dynamically remove icons associated with options that are unavailable for the selected preliminary results. For example, GUIs displayed in client devices 150 may include interactive icons for options that allow users to narrow down image classification results. In step 706, inventory search system 105 may remove interactive icons, such as buttons or toggle icons, associated with the unavailable options. For example, inventory search system 105 may perform operations to remove icons or other attributes in the GUI such as:

$(".IvItem").each(function( ){
　$(this).removeAttr('data-icon');
　$(this).data('icon','value-1');
　icon=$(this).data('icon');});

Alternatively, or additionally, inventory search system 105 may add icons or elements based on the available options. For example, a user may select both BMW and Mercedes Benz options. Then, the option of colors blue, green, and yellow may become available. In such scenarios, inventory search system 105 may dynamically update the GUI to add icons with the available options that became available based on the selections of step 704.

In step 708, inventory search system 105 may receive a selection of one or more options in the GUI. For example, inventory search system 105 may receive the selection of colors, models, conditions, via interactive icons in the GUI.

In step 710, inventory search system 105 may query the memory or database to identify other available options for the preliminary results that overlap with the selected options of step 708. For example, when in step 702 a user selects BMW® and in step 708 a user selects color black, inventory search system 105 may query a memory or a database to identify what other available options are also available for black BMW®. By querying the memory, inventory search system 105 may identify that for black BMW® the only available model is 2020 and new condition. In some embodiments, the memory queried in step 704 may be the same memory queried in step 710. Thus, local or rapid access memories may be accessed in step 710 to dynamically update the GUIs based on user selections. For example, when process 700 is performed by processor 502, processor 502 may access memory 510 in step 710.

In step 712, like in step 708, inventory search system 105 may remove or add icons for the available options based on the overlapping options identified in step 710. For example, because for the selection of black BMW the only model is 2020, inventory search system 105 may dynamically update the graphical user interface to eliminate interactive icons that are no longer available based on the user selections. When adding icons, inventory search system 105 may retrieve images related for the available options. For example, inventory search system 105 may perform operations such as "piece1Labels[0].setIcon(new ImageIcon (newimage.jpg))" to add new icons in the GUI.

In step 714, inventory search system 105 may refresh or update the rendering of the graphical user interface based on the selections and available options and displayed icons. For example, in step 714, inventory search system 105 may readjust size and location of icons in the GUI to maximize the interaction with the user. To refresh GUIs, inventory search system 105 may update the group of available options by mapping the selected result icon with possible options in a look-up table or metafile and modify the first graphical user interface by eliminating a filter icon associated with options not present in the updated group of available options. Alternatively, or additionally, inventory search system 105 may update the group of available options by correlating the selected at least one of the plurality of filter or option icons with other options in the look-up table and modify the GUI by eliminating filter icons associated with options not present in the updated group of available options.

In step 716, inventory search system 105 may transmit the user selections to a server or other elements of system 100 to perform the filtered search. For example, inventory search system 105 may transmit the user selections to recognizer processor 230 to identify results relevant for the user based on the user selections. Alternatively, when process 700 is being performed by client devices 150, client devices 150 may transmit the user selections to inventory search system 105 in step 716 to receive classification results based on the user selections.

In some embodiments, in step 716, inventory search system 105 may transmit information to online resources 140, which may have updated information about dealer inventories and locations to provide accurate information for the user search. For example, inventory search system 105 may send an information query to websites such as Kelly Blue Book to collect condition information. In yet other embodiments, inventory search system 105 may send queries to dealer or automobile manufacturer websites to collect additional information of the vehicle.

Figure 8:
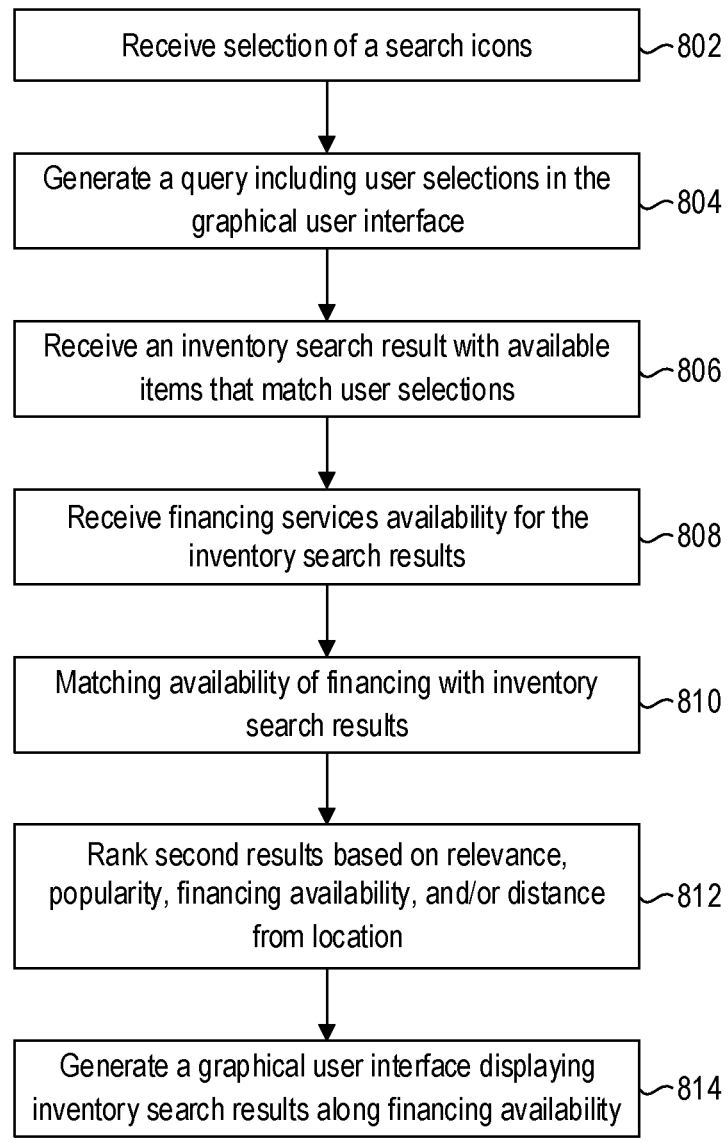
FIG. 8 is a flow chart illustrating an exemplary server query and secondary search process, consistent with disclosed embodiments.

Referring now to FIG. 8, there is shown a flow chart of an exemplary secondary search process 800, consistent with disclosed embodiments. In some embodiments, as described below, process 800 may be executed by inventory search system 105. For example, image recognizer 110 may perform steps in process 800 to identify inventory search results and communicate them to client devices 150. In other embodiments, however, process 800 may be performed by client devices 150. For example, processor(s) 502 in client devices 150 may execute instructions in vehicle identification application 514 (FIG. 5) to perform process 800 and search for secondary results. Further, in some embodiments process 800 may be performed by multiple elements of system 100.

In step 802, inventory search system 105 may receive the selection of one or more interactive icons in a GUI. For example, inventory search system 105 may receive the selection of one or more icons in the GUI generated via process 600 (FIG. 6). The selection may include one or more preliminary results and one or more options. As previously, discussed, in connection with FIG. 7, the selection may dynamically change the appearance of the GUI and eliminate or add interactive icons.

In step 804, inventory search system 105 may generate a query including user selections in the GUI. For example, when a user selects the result icon of a BMW and options for model '2010'; color 'black,' and condition 'new,' inventory search system 105 may generate a query for a server that includes these parameters for a search. For example, inventory search system 105 may generate and HTTP query for a server in system 100 or for databases 180. Alternatively, or additionally, the query of step 804 may be coded as a URL or URI that may be decoded by other elements of system 100. In some embodiments, the query may include additional information from the one selected by the user. For example, in some embodiments the query may include location information of client devices. Additionally, the query may include user preferences. For example, in addition to the user selections of vehicle make, color, and model, the query of step 804 may include location coordinates of client devices 150 associated with the query and user preferences, such as a limited listed of preferred dealers. In embodiments where client devices 150 implement process 800, client devices 150 may generate and transmit the query to other elements of system 100. For example, client devices 150 may generate a search query for inventory search system 105. Alternatively, or additionally, client devices 150 may generate a search query for inventory search system 105 including the vehicle make, the vehicle model, an option selected in the filter icons, a client device location, and user account information associated with the client device.

In step 806, inventory search system 105 may receive an inventory search results with available items that match user selections and/or other parameters transmitted in the query of step 804. For example, based on the query of step 804 databases 180 (or other element of system 100 with inventory information) may provide a list of results that match the attributes selected by the user and/or included automatically in the request. Continuing the previous example with a query including BMW and options for model '2010'; color 'black,' and condition 'new,' in step 806 inventory search system 105 may receive a list of vehicles available in the inventory that match the user selections and/or parameters in the query. The inventory search results of step 806 may include thumbnail images of the results and be associated with information specifying information such as location or price.

In step 808, inventory search system 105 may receive information from financing services availability for results in the inventory search. As further described in connection with FIG. 14, inventory search system 105 may send the inventory results of step 806 and client information to a financing service. The financing service may then determine if there is financing availability for the client and the particular vehicle. For example, based on the client information, price of the vehicle, and location of the vehicle (e.g., the specific automobile dealer offering the vehicle), a financing service may determine if it can provide financing to the client if the client decides to buy the vehicle. In some embodiments, the financing availability determinations may be done independently for each one of inventory search results of step 806. However, in other embodiments, the financing availability may be determined for groups of inventory results or for groups of client devices 150. Thus, in step 808, inventory search system 105 may receive financing services availability for the inventory results and in step 810 inventory search system 105 may march inventory results with their corresponding financing availability. For example, in step 810, inventory search system 105 may generate an array associating inventory results with financing options or conditions. In some embodiments, inventory search system 105 may perform matching functions in step 810 such as:

```
match<-function(dat1, dat2, dat3){
    selectedRows<-(dat1$ID % in % dat2$ID & dat1$ID
        % in % dat3$ID)
    matchdata<-dat1[selected Rows]
    return(matchdata)}
prepost.match.data=match(all.data, pre.data, post.data)
```

In step 812, inventory search system 105 may rank the inventory results in step 806 (which may also be secondary results because they may be based on primary results in process 600) based on relevance, popularity, financing availability, and/or distance from location. In some embodiments, the ranking may be based on user preferences or selections. For example, if the user prefers ranking based on popularity, then inventory search system 105 may rank secondary results based on popularity. In other embodiments, however, inventory search system 105 may rank inventory of secondary results by considering the multiple variables together.

In step 814, inventory search system 105 may generate a GUI displaying the inventory search results. In embodiments in which there is financing availability for one or more of the inventory search results, the GUI in step 814 may include the financing availability. For example, the GUI may display secondary results with financing availability. In such embodiments, each one of the secondary results may be presented as an interactive icon that may link to finance service systems. An exemplary GUI generated in step 814 is further described in connection with FIG. 18.

Figure 9:
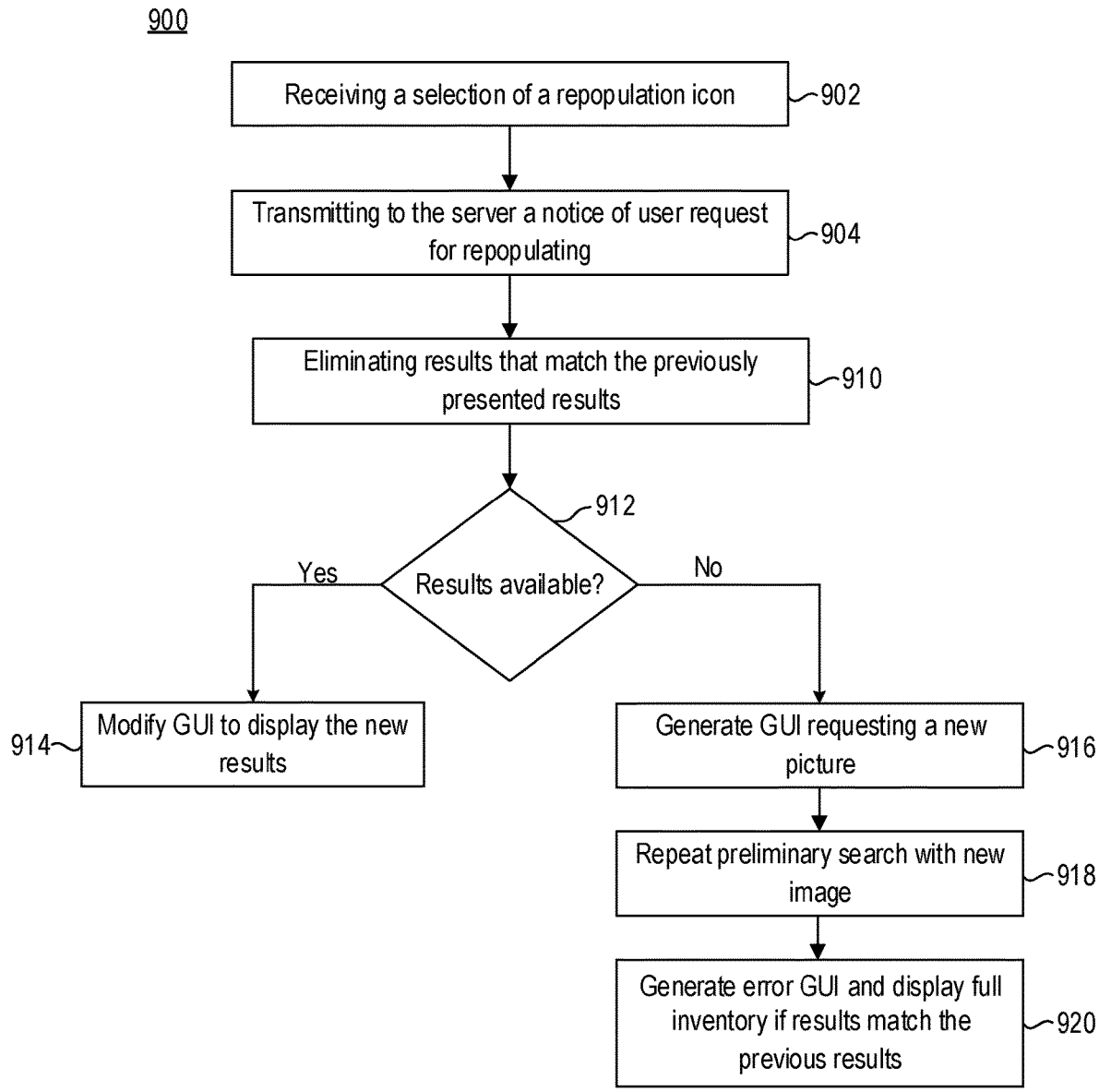
FIG. 9 is a flow chart illustrating an exemplary process for repopulating primary results, consistent with disclosed embodiments.

Referring now to FIG. 9, there is shown a flow chart of an exemplary process for repopulating primary results, consistent with disclosed embodiments. In some embodiments, as described below, process 900 may be executed by inventory search system 105. For example, image recognizer 110 may perform steps in process 900, generating or modifying GUIs to display additional results and communicate them to client devices 150. In other embodiments, however, process 900 may be performed by client devices 150. For example, processor(s) 502 in client devices 150 modify GUIs presented in a display based on process 900 and user selections. Further, in some embodiments process 900 may be performed by multiple elements of system 100.

In step 902, inventory search system 105 may receive a selection of a repopulation icon. As further described in connection with FIG. 16, the GUI generated in process 600 (FIG. 6) may include a repopulation icon. A user may select the repopulation icon when it is not satisfied with the preliminary results presented or when it wants to review additional options. Then, process 900 may get triggered by the user selection of a repopulation icon.

In step 904, inventory search system 105 may transmit to a server or database a notice of the user request for repopulating the results. In some embodiments, user requests for additional preliminary results may indicate the preliminary results were not relevant or inaccurate. In turn, this lack of accuracy may require predictive model corrections. For example, that a user indicates a result was not relevant may indicate model generator 120 is issuing inaccurate models. Thus, in some embodiments a message may be transmitted to model generator 120 to generate a corrected model. For example, as further described in connection to FIG. 12, user inputs when selecting the repopulating icon in step 902 may be used to add data to a training dataset that is then used to update classification or identification models.

In step 910, inventory search system 105 may eliminate results that match the previously presented results. For example, if previously presented results included BMW and Mercedes Benz and the user selected to repopulate, inventory search system 105 may eliminate any results that have BMW and Mercedes Benz in step 910. In this way, inventory search system 105 assures that the user will see new results when selecting the repopulate icon. For example, inventory search system 105 may eliminate previously presented results from the subset of results that is used to generate the results icons. Further, in eliminating results that match previously presented results, inventory search system 105 may execute instructions to substitute images in the GUI such as:

```
img=imagei
if (label !=null) {
    label.seticon(new ImageIcon(img));
    label.repaint( );}
    super.paintComponent(g);
    drawImage(img.getImage( ),0, 0, getWidth( ), getHeight(), this);
```

As discussed below in connection with FIG. 17, these repopulation of preliminary results in the GUI may also generate alerts for the identification model signaling improper results.

In step 912, inventory search system 105 may determine if there are still results available in a group of results to present, despite the elimination of results in step 910. For example, inventory search system 105 may determine if the subset of preliminary results to be presented is void. If there are results available to display (step 912: Yes), inventory search system 105 may continue to step 914 and modify the GUI to display the results not eliminated in step 910. This will display new results that match the attributes in the sample image but have not been displayed for the user. However, if there are no results available to display (step 912: No), inventory search system 105 may conclude that there are not alternative results to show to the user in response to the repopulate request and continue to step 916. In step 916, inventory search system 105 may generate a GUI requesting a new picture to attempt a new image classification. For example, inventory search system 105 may generate a GUI similar to the one presented in connection to FIG. 20 to retake an image and attempt a new image classification. Alternatively, in step 916 a GUI may request a user reopen the augmented reality application, such as vehicle identification application 514, to capture a new sample image.

In step 918, inventory search system 105 may repeat the preliminary search using a newly captured image. That is, inventory search system 105 may repeat process 600 for the new image, extracting attributes and identifying similar images in local memories to present preliminary results. However, if the results obtained in step 918 match the results previously presented, when receiving a selection of the repopulation icon in step 912, inventory search system 105 may continue to step 920 and generate a graphical user interface. In such embodiments, the repeated selection of a repopulation icon may indicate that the identification model is underperforming for the specific attributes that were identified. In such embodiments, inventory search system 105 may send a notice to model generator 120 to note the deficiencies of the model and start taking corrective measurements. Alternatively, in step 920 inventory search system 105 may be configured to display a full inventory of secondary results when the preliminary search of step 918 is unsuccessful as providing the same inaccurate results.

Process 900 has been described as being performed by inventory search system 105. However, as previously discussed, in some embodiments client devices 150 may be performing process 900 and perform the determinations of process 900 and attribute extractions with processor 502.

Figure 10:
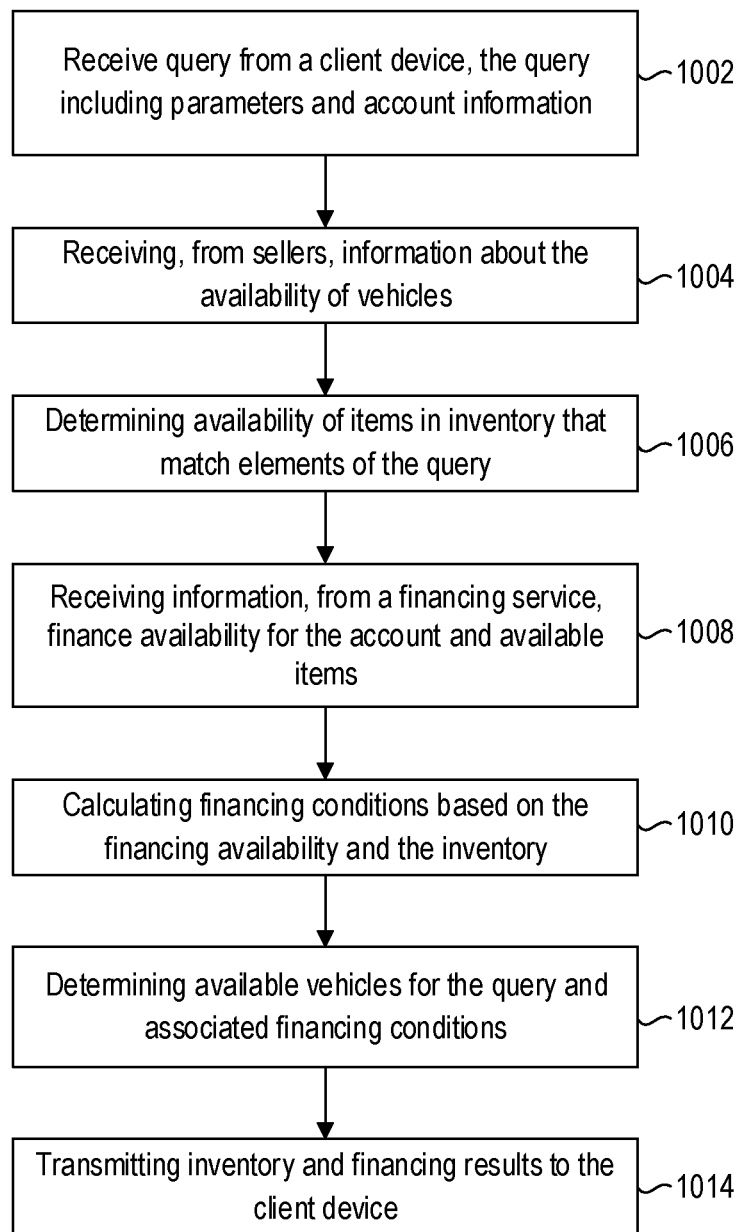
FIG. 10 is a flow chart illustrating an exemplary client query resolution process, consistent with disclosed embodiments.

Referring now to FIG. 10, there is shown a flow chart of an exemplary a client query resolution process 1000, consistent with disclosed embodiments. In some embodiments, process 1000 may be executed by inventory search system 105. In other embodiments, however, process 1000 may be performed by online resources 140. For example, online resources 140 related to the determination of financing availability may perform process 1000. Further, in some embodiments process 1000 may be performed by multiple elements of system 100.

In step 1002, inventory search system 105 may receive a query from client devices 150. For example, inventory search system 105 may receive the query described in step 804 from client devices 150. The query may include search parameters (such as user selections in the interactive icons), an account information based on the user of the client devices 150, and/or client identification in the vehicle identification application 514.

In step 1004, inventory search system 105 may receive information about the availability of vehicles. For example, when the image classification is for vehicle images, inventory search system 105 may receive inventory information from online resources 140 associated with vehicle dealers, vehicle manufacturers, and/or aggregator websites. Alternatively, or additionally, databases 180 may send inventory information to inventory search system 105 with items available. In some embodiments, the inventory search may be limited to some parameters of the search query. For example, the list of available items received in step 1004 may be limited to items within a location or limited to certain user preferences.

In step 1006, inventory search system 105 may determine availability of items in the inventory that match elements of the query. In some embodiments, inventory search system 105 may generate an array, or similar information structures, correlating the query elements with items in the inventory received in step 1004. For example, inventory search system 105 may determine which items from the inventory list match query parameters.

In step 1008, inventory search system 105 may receive information of finance availability based on an account associated with the query and the items in the inventory list that match the query requirements. In some embodiments, the finance availability information may be received from online resources 140. For example, as further described in connection with FIG. 14 an online resource 140 associated with a finance service may provide financing availability for items in the inventory list.

In step 1010, inventory search system 105 may calculate financing conditions based on the financing availability and the items in the inventory. For example, inventory search system 105 may determine monthly payments, interest rates, and/or other financing considerations in step 1010 for elements in the inventory list.

In step 1012, inventory search system 105 may determine available vehicles for the query and associate financing conditions. For example, inventory search system 105 may generate a composite list that includes both the vehicles from the inventory that match the query attributes or requirements with the financing conditions calculated in step 1010.

In step 1014, inventory search system 105 may transmit inventory results and financing information to other elements of system 100. For example, inventory search system 105 may transmit a list of vehicles that match the query requirements with associated financing conditions to client devices 150. In some embodiments, the inventory results and financing information may be transmitted with graphical elements, such as images or interactive icons, to generate GUIs in client devices 150. For example, information transmitted in step 1014 may be used to generate GUIs as further discussed in FIG. 18.

Figure 11:
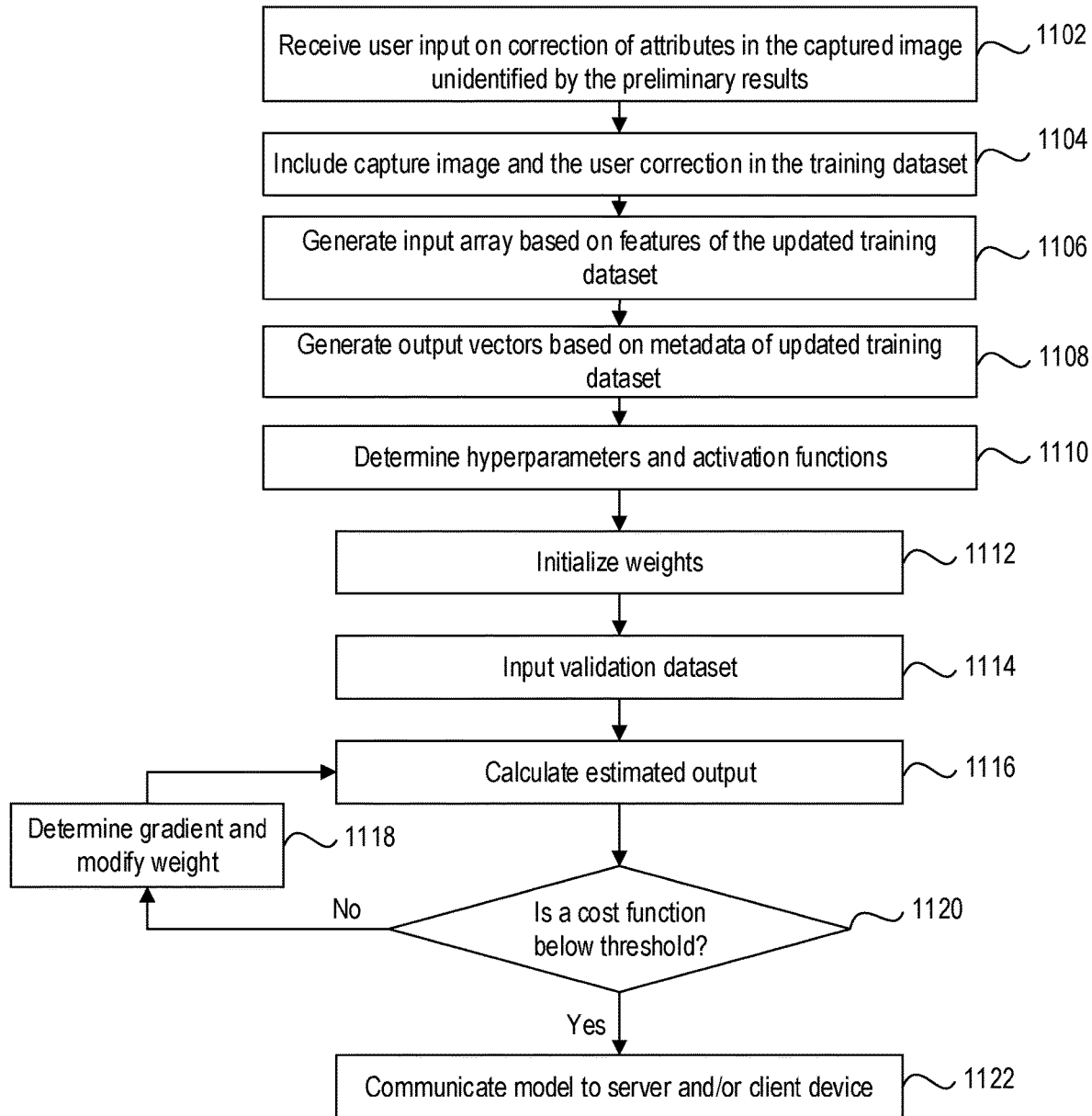
FIG. 11 is a flow chart illustrating an exemplary process for generating an identification model, consistent with disclosed embodiments.

Referring now to FIG. 11, there is shown a flow chart of an exemplary illustrating a process 1100 for generating an identification model, consistent with disclosed embodiments. Process 1100 may be performed by inventory search system 105. For example, process 1100 may be executed by model builder 346 (FIG. 2) and may be configured to generate classification models, such as convolutional neural networks, to identify images. In other embodiments, however, process 1100 may be performed by client devices 150. For example, process 1100 may be performed by processor 502.

In step 1102, inventory search system 105 may partition images into a training data set and a validation data set. For example, inventory search system 105 may receive data representing a plurality of images of vehicles. The images may be associated with metadata describing attributes of the vehicle in the image. Inventory search system 105 may divide the images of the vehicles and generate two groups, one to train the convolutional neural network and a second to validate the model. Alternatively, or additionally, inventory search system 105 may segregate images to train and validate recurrent neural network or random forest for image identification.

In step 1104, inventory search system 105 may generate an input array based on features of the training data set. For example, inventory search system 105 may generate a variable including feature information of images in the training data set.

In step 1106, inventory search system 105 may generate output vectors based on metadata of the training data set. For example, based on the images in the training data set, the identification system may generate a desired output vector identifying vehicle make and model that is included in the training data set.

In step 1108, inventory search system 105 may determine hyperparameters and activation functions to initialize the model to be created. For example, inventory search system 105 may select a number of layers and nodes, and determine whether the network will be fully or partially connected. In addition, in step 1108 inventory search system 105 may determine the dimensionality of the network and/or determine stacks of receptive field convolution networks. Alternatively, or additionally, inventory search system 105 may determine a pixel input resize value. In some embodiments, the selection of the pixel input resize value may be determined by a neural net architecture and the selection of the neural net architecture may be based on a required identification speed.

Moreover, in step 1108 inventory search system 105 may also associate the model with one or more activation functions. For example, inventory search system 105 may associate the model with one or more sigmoidal functions. Moreover, in step 1110 inventory search system 105 may initialize weights for synapsis in the network.

In step 1112, inventory search system 105 may apply the input array based on features of training data set of step 1104 to calculate an estimated output in step 1114 and a cost function. In step 1120, inventory search system 105 may determine whether the cost function is below a threshold of required accuracy, which may be specified by the user. If inventory search system 105 determines that the cost function is not below a threshold and the required accuracy has not being achieved (step 1120: No), inventory search system 105 may continue to step 1118 and determine a gradient to modify weights in synapsis or modify the activation functions in the different nodes. However, if the cost function if below a threshold (step 1120: Yes), identification system may accept the model and communicate the model to a server in system 100 and/or client devices 150 in step 1122.

Figure 12:
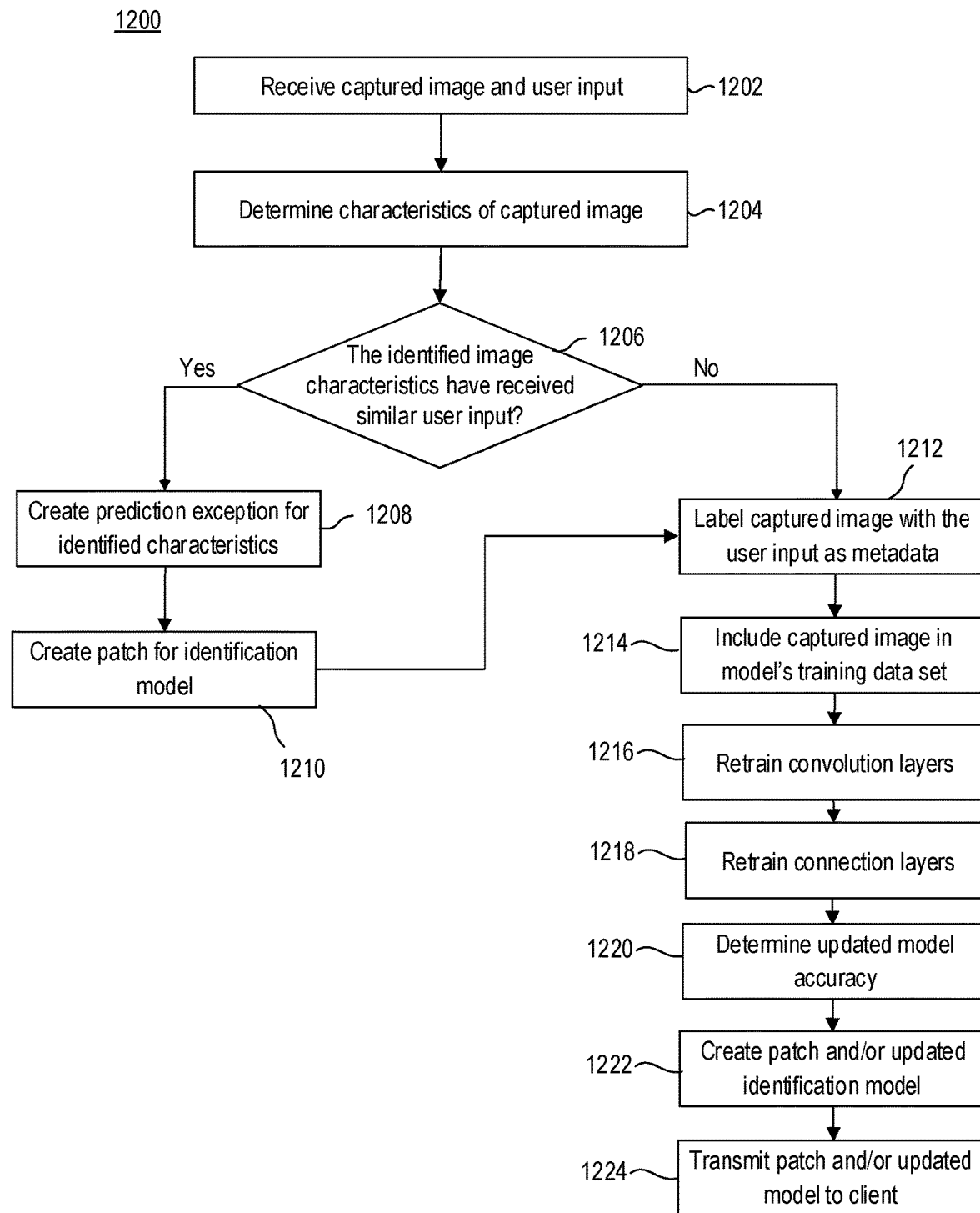
FIG. 12 is a flow chart illustrating an exemplary patch generation process, consistent with disclosed embodiments.

Referring now to FIG. 12, there is shown a flow chart of an exemplary patch generation process 1200, consistent with disclosed embodiments. In some embodiments, process 1200 may be executed by inventory search system 105. For example, model generator 120 may perform steps in process 1200, generating patches for identification or classification models. The patches may then be transmitted to client devices 150 to update image classification or identification models or improve image classification accuracy. In other embodiments, however, process 1200 may be performed by other elements of system 100. For example, online resources 140 or computing clusters 160 may perform process 1200. Further, in some embodiments process 1200 may be performed by multiple elements of system 100.

After a model is trained and validated, the model may return inaccurate results for certain scenarios. For example, images that are different from the ones used in the training or validation data sets in process 1100 may return results that are inaccurate or irrelevant. Further, accuracy metrics of the identification models may not generalize for other kind of image. For example, some classification or identification models may be tailored for the training datasets. Thus, it may be difficult to have image classification or identification models that are highly accurate for multiple sample images. Also, because image recognition and identification models may not provide clear top results (i.e., multiple results may match attributes extracted from a sample image), it may be difficult to identify results that should be presented to the user. Particularly in portable and small screens, where is impractical to show multiple classification results, the plurality of results that may result from classification models may make it difficult to identify the selected results.

The disclosed systems and methods address these technical difficulties with GUIs that allow users to easily interact with model generators to provide feedback and correct modeling parameters. For example, through process 1200 inventory search system 105 may identify scenarios in which the model is not performing well and update the model to correct mistakes.

Process 1200 may begin with step 1202. In step 1202, inventory search system 105 may receive a captured image along with user input. As further described in connection with FIG. 17, in some embodiments a user may be presented a GUI that allows the user to input information of the scanned image. In such embodiments, the user may notify inventory search system 105 that the preliminary results presented in the GUI are incorrect and specify parameters that the model should have identified. The image received in step 1202 may be the image that resulted in the inaccurate results and may be labeled or tagged with the information that the user inputted as the correct information. For example, a user may have captured an image that the model identified as a black BMW. However, the user disagrees with the presented result because the results should show a black Mercedes Benz. The user can, thus, notify that the image classification was inaccurate and specify that correct result. In this example, inventory search system 105 may receive the captured image that resulted in the inaccurate result that has been modified to include metadata of the user input in step 1202. In such embodiments, client devices 150 may perform operations to compress and/or modify the metadata of the image when sending it as feedback to inventory search system 105. For example, client devices 150 may modify EXIF metadata and perform operations such as '$ exiftool "-MakeMetadata-=Mercedes"' to change the metadata of images using the user's input.

In step 1204 inventory search system 105 may determine characteristics of the captured image that was received in step 1202. For example, inventory search system 105 may perform attribute extraction using pre-trained networks to identify characteristics or attributes in the image. In some embodiments, in step 1204 inventory search system 105 may re-analyze the captured image to determine attributes such as make, model, trim, and/or color. These extracted values may then be compared with the user input received in step 1202 and inventory search system 105 may identify inconsistencies. The inconsistencies may then specify which parameters the identification model is missing and identify elements in which the model is underperforming.

In step 1206, inventory search system 105 may determine whether the identified image characteristics have received similar user input. To identify repeated mistakes, inventory search system 105 may determine if similar images (i.e., images with similar attributes as identified in step 1204) are receiving similar user input. For example, inventory search system 105 may determine whether images that the model believes to be black BMW are being frequently corrected for black Mercedes Benz. Alternatively, inventory search system 105 may determine whether images that the model believes to be BMW 3 series (i.e., make/model) have been frequently corrected for a different make model combination, such as BMW 5 series. Repeated corrections of similar images may indicate that the model is biased, not properly trained, or has a consistent issue with specific attributes of black BMW. If inventory search system 105 determines that identified image characteristics have received similar user input (step 1206: Yes), inventory search system 105 may continue to step 1208 and create an exception for identified characteristics. For example, if the model is frequently outputting BMW but users frequently correct the results for Mercedes Benz, inventory search system 105 may create a model exception. The exception may specify that the classification model should output Mercedes Benz when identifying BMW. Including these exceptions in the identification model may be performed with conditional routines that substitute results based on the exception.

In step 1210, inventory search system 105 may create a patch for identification or classification models to include the exception. The patch may be a script that modifies the model response to images with characteristics similar to the ones identified in step 1204. For example, the patch may address the inconsistent or inaccurate results and introduce functionality regressions. The patch developed in step 1210 may be packaged in a form that is easily deployable and installable by users. For example, the patch may be configured to automatically execute commands in client devices 150 and/or invoke patch management systems in the Operating System (OS) of client devices 150. The packaging format of the patch may depend on the installation technology used for the software. For example, packaging formats of the patch may include Windows Installer for Windows and RPM (Red Hat Package Management) for Linux or iOS. Further the patch may be an executable file such as an .exe.

The patch with exception of step 1210 may be configured to be in a self-contained package that is identified by name, target application or operating system, processor architecture, and language locale. In addition, the patch's relationship with previously released patches may also be described within the patch file. Further, inventory search system 105 may be configured to support silent installation through the command line of the target operating system. The silent installation options may be the same for multiple patches created by inventory search system 105 to facilitate administrative cost of incorporating the patch into patch management solutions. Moreover, the patch may include operations for services/daemons that can be restarted automatically, and in-memory code can be patched while running. Moreover, the patch created in step 1210 may be protected from tampering and their integrity may be verifiable through digital signatures, hashes, or checksums. In some embodiments, digital signatures may be preferred.

In step 1206 inventory search system 105 may determine whether characteristics identified from the image have not previously received similar user input. That is, users have not provided consistent feedback for the determined characteristics. For example, inventory search system 105 may determine the inaccuracy identified by the user and reported in step 1202 has not been received before. This may indicate that the model had only one inaccurate result, which is not frequent, or that different users have been providing varying feedback for similar images—indicating the model may not be consistently wrong, but only in certain occasions. Then, if inventory search system 105 determines the identified characteristic has not received similar user input (step 1206: No), inventory search system 105 may skip steps 1208 and 1210 and continue to step 1212.

In step 1212, inventory search system 105 may label the captured image with the user input as metadata. For example, in embodiments in which client devices do not modify images received in step 1202, but instead send unprocessed and separated captured images and user input, inventory search system 105 may label the captured image with inaccurate results using the user input. For example, inventory search system 105 may modify images by including metadata using operations such as:

var jpeg=new JpegMetadataAdapter(pathToJpeg);
    jpeg. Metadata.Comment="labels";
    jpeg.Metadata.Title="labeltitle";
    jpeg.Save( );
    jpeg.SaveAs(Path);

Alternatively, or additionally, inventory search system 105 may modify the captured image by modifying metadata related to the captured image to include user input in feedback GUIs, as further described in connection to FIG. 17.

In step 1214, inventory search system 105 may include the captured image, now labeled using the user input, in the model training and/or validation datasets. With the disclosed system of GUIs that allow providing feedback to model generator 120, user interactions in client devices 150 may be leveraged to seamlessly increase the images in the training dataset using user-labeled images to enhance the accuracy of the models.

In step 1216, inventory search system 105 may retrain the model used for classification or identification of images. For example, inventory search system 105 may retrain convolution layers used in a CNN for image identification. Further, in step 1218 inventory search system 105 may retrain connection layers of the model. For example, in steps 1216-1218 inventory search system 105 may take a pre-trained network and remove the last fully connected layer, then treat the rest of the net as a fixed feature extractor for the new dataset. In such embodiments, inventory search system 105 may recompute vectors for every image that contains the activations of the hidden layer immediately before the classifier. For example, inventory search system 105 may execute updates to CNN layers, which may include ReLUd (i.e. threshold at zero), to retrain convolution and connection layers in steps 1216-1218.

In step 1220, inventory search system 105 may determine updated model accuracy. For example, inventory search system 105 may perform cost function evaluations of the retrained model, as further described in connection with FIG. 11.

If the model is acceptable, inventory search system 105 may create a patch for an existing model and/or an updated classification or identification model in step 1222. For example, inventory search system 105 may create a patch that updates a model running in client devices 150. In such embodiments, inventory search system 105 may use APIs to access offline models and update the parameters of the model based on the recalculations in steps 1216-1218. Further, in step 1222 inventory search system 105 may access an application in client devices 150, such as vehicle identification application 514 to update the model. Additionally, or alternatively, inventory search system 105 may customize image classification models. For example, inventory search system 105 may build a custom TensorFlow Lite model to run locally on the end user's device or a patch to customize the TensorFlow. Further, the patch may include a classification model exception for attributes identified in step 1204, and include exceptions based on user input.

In step 1224, inventory search system 105 may deploy the patch and/or updated model the client devices 150. For example, once the patch has been verified to address the issues identified in step 1206 and the patch passes compatibility testing, inventory search system 105 may notify client devices 150 of the availability of the patch so they can download and deploy it on their systems. In some embodiments, inventory search system 105 may provide information on the severity of the problem, the urgency of the patch, and potential mitigations.

In some embodiments, inventory search system 105 may employ patch distribution systems/services, such as online resources 140, that perform an automated method for easily distributing patches to client devices 150. This patch distribution service may include predetermined bandwidth availability to handle the often high number of concurrent users attempting to download the patch. In some embodiments, inventory search system 105 may consider not only the bandwidth of their distribution system as a whole, but also the specific bandwidth required to download an individual patch. To prevent network congestion and service unviability, inventory search system 105 may limit the number of transmissions of patch and/or updated models in step 1224. Particularly, if the patch or updated model includes several megabytes, may require some coordination of patch deployment. In some embodiments, transmitting the patch in step 1224 may include transmitting credentials to client devices 150 before the download. To prevent viruses to be disguised as patches, inventory search system 105 may provide certificates to minimize risk. The patched or updated model transmitted in step 1224 may minimize errors associated with inaccurate identification of images with the characteristics identified in step 1204.

Figure 13:
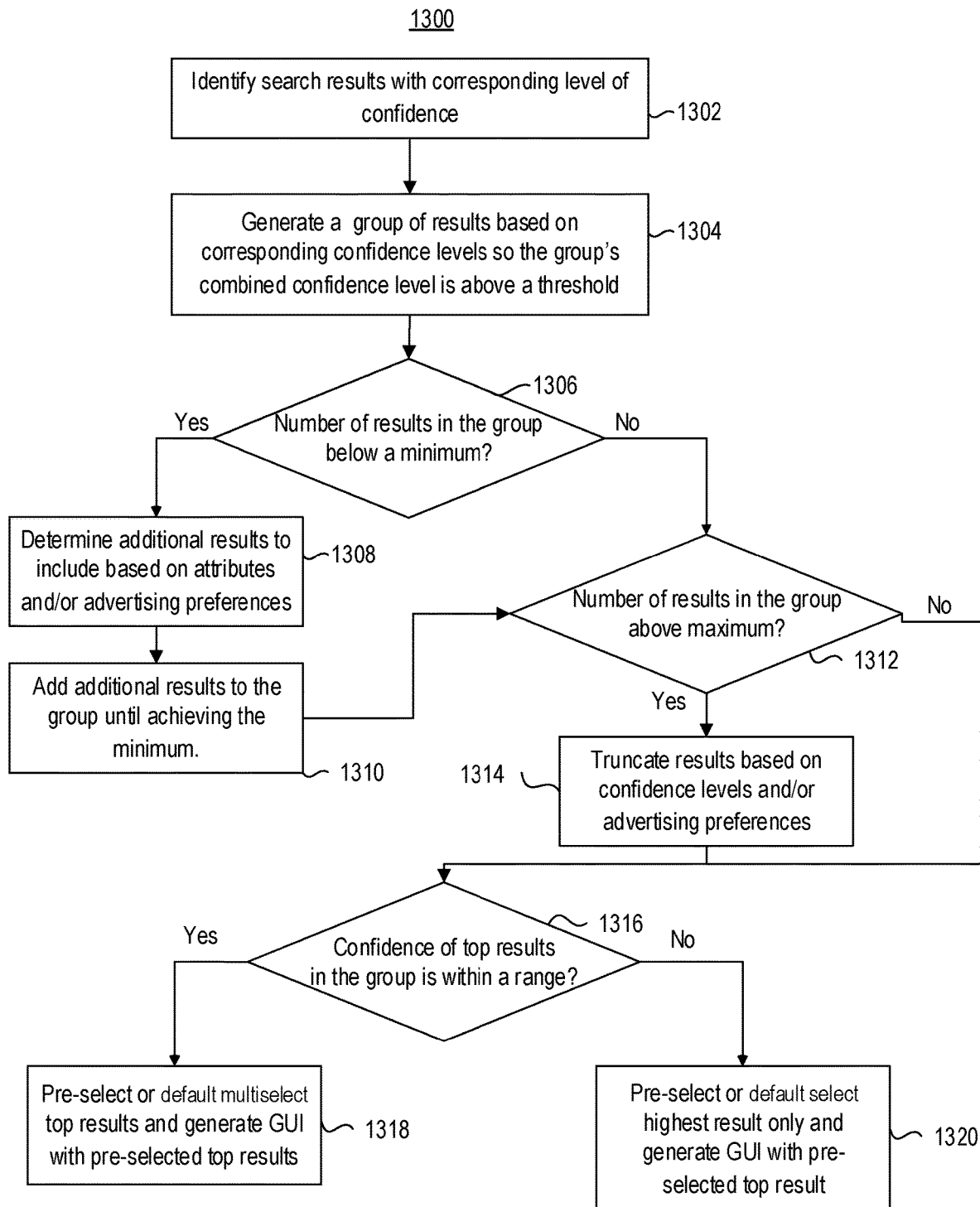
FIG. 13 is a flow chart illustrating an exemplary process for selecting results displayed in a graphical user interface, consistent with disclosed embodiments.

Referring now to FIG. 13, there is shown a flow chart of an exemplary process for selecting results displayed in a graphical user interface, consistent with disclosed embodiments. In some embodiments, process 1300 may be executed by inventory search system 105. For example, image recognizer 110 may perform steps in process 1300, generating or modifying GUIs to display results and communicate them to client devices 150. In other embodiments, however, process 1300 may be performed by client devices 150. For example, processor(s) 502 in client devices 150 modify GUIs presented in a display based on process 1300 and user selections. Further, in some embodiments process 1300 may be performed by multiple elements of system 100.

In step 1302, inventory search system 105 may identify classification results that match search parameters in the sample image captured by a user. For example, in step 1302 inventory search system 105 may identify results based on images received from client devices 150 using search processes further described in connection with FIG. 6. In some embodiments, results identified in step 1302 may be associated with a level of confidence or an estimated percentage accuracy. For example, each one of the results identified in step 1302 may be associated with a percentage of probability in a probability density function, such as probability of 50% or 30%.

In step 1304, inventory search system 105 may generate a group of model or classification results based on corresponding confidence levels. In some embodiments, the selected results may be based on a achieving a threshold confidence level. For example, after the image identification process inventory search system 105 may have 10 results. Each result may be associated with a confidence level. For example, the results may have confidence levels of 50%, 15%, 10%, 5%, 4%, 4%, 4%, 4%, 2%, 2%. Then, inventory search system 105 may select results that reach a confidence threshold of 80%, selecting the results with 50%, 15%, 10%, 5%. This selection of classification results based on confidence levels may enable inventory search system 105 to more efficiently use the limited screen in client devices 150. By reducing the number of results that are presented to the client, while achieving a minimum threshold of confidence, inventory search system 105 may improve the user experience, minimize network congestion, but have a high likelihood the user will see relevant results.

In step 1306, inventory search system 105 may determine whether the number of results in the group generated in step 1304 is below a minimum number. Continuing with the previous example, in step 1304 inventory search system 105 may have created a group of results with 4 items, respectively with confidence levels of 50%, 15%, 10%, 5%. However, inventory search system 105 may be configured to show a minimum of 5 results in a GUI. This may be a user visualization preference. Alternatively, or additionally, the minimum may be determined on the type of client devices 150 that will display the GUI with results. For example, the minimum number of results for the group may be greater for client devices 150 with large screens (such as tablets) than for client devices 150 with small screens (such as smartwatches). As previously discussed in connection to FIG. 7, queries from client devices 150 may include device information including the type of screen available in the device. Further, in embodiments in which client devices 150 perform process 1300, client devices 150 may determine the minimum number of elements in the group based on user configurations, concurrent applications, and the characteristics of the display.

If inventory search system 105 determines that the number of results in the group is below the minimum (step 1306: Yes), inventory search system 105 may continue to step 1308 and determine additional results to include based on attributes and/or advertising preferences. For example, in step 1308 inventory search system 105 may identify one or more of the additional elements that were identified in step 1302, selecting one of the results associated with 4% confidence value to meet the minimum number. Alternatively, or additionally, the selection of the additional results to add to the group generated in step 1304 may be based on advertising considerations. For example, inventory search system 105 may prefer certain vehicle dealers based on advertising considerations. Items related to the preferred dealers may be added to the group in step 1308. In step 1310, the additional results identified in step 1308 may be added to the group until achieving the minimum number of results to be display. In some embodiments steps 1308-1310 may be iterative, adding results to the group one by one and making independent determinations until reaching the minimum number. Alternatively, or additionally, inventory search system 105 may be configured to perform a sequence of operations of determining whether a number of the results in the group (or subset) of step 1304 is below a minimum number, determining a location of client devices 150 when the number of the first results in the subset (or group) is below the minimum number, selecting a group of the first results based on the location (where results in the group being different from results in the subset), and adding the group of first results to the subset in step 1310.

However, if in step 1306 inventory search system 105 determines that the number of results is not below a minimum (step 1306: No), process 1300 may continue directly to step 1312. In step 1312, inventory search system 105 may determine if the number of results in the group is above a maximum. Similarly, to the minimum number of results, the maximum number of results may be based on visualization preferences or display size. For example, when client devices 150 include smartwatches, the display may be limited to a single result. Then, the maximum number may be one. Alternatively, when client devices 150 include smartphones, the display may be limited to three classification results.

When in step 1312 inventory search system 105 determines that the number of results is above a maximum number (step 1312: Yes), inventory search system 105 may continue to step 1314 and truncate results. In some embodiments, inventory search system 105 may truncate results based on confidence levels and/or advertising preferences. For example, from the group of results with confidence levels 50%, 15%, 10%, 5% (selected in step 1304), inventory search system 105 may eliminate the 5% results, because it has the lowest confidence level. However, in other embodiments inventory search system 105 may truncate elements based on advertising preferences. For example, inventory search system 105 may eliminate the 10% confidence result when the 5% confidence result is associated with a preferred dealer. Thus, inventory search system 105 may determine whether the number of first results in the subset is above a maximum number in step 1312, the maximum number being based on visualization preferences, to then eliminate first results in the subset associated with lower probability scores until the number of first results in the subset matches the maximum number in step 1314.

Alternatively, or additionally, inventory search system 105 may retrieve from a local memory a set of visualization preferences, the set of visualization preferences including a maximum number of results to be displayed in the first graphical user interface. Then, inventory search system 105 may eliminate a first result based on a corresponding confidence score to match the maximum number. In such embodiments, visualization preferences may include a list of preferred filter icons and only preferred filter icons are displayed in the first graphical user interface.

However, if inventory search system 105 determines that the number of results is not above a maximum number (step 1312: No), inventory search system 105 may continue to step 1316 directly. In step 1316, inventory search system 105 may determine if the confidence level of top results in the group, after additional or eliminating results in steps 1308-1312, are within a confidence level range. For example, inventory search system 105 may evaluate whether results are within a 10% confidence level. This may be associated with multiple results that all have similar probabilities of being relevant for the user. For instance, if the group of results generated in step 1304 have confidence levels of 30%, 25%, and 22%, then inventory search system 105 may determine that the top results in the group have confidence levels within the confidence level range. However, if the results in the group have confidence levels of 50%, 15%, 10%, then inventory search system 105 may determine that the confidence levels of classification results are not within the range.

If inventory search system 105 determines that the confidence levels are within a range (step 1316: Yes), process 1300 may continue to step 1318 and pre-select or default multiselect top results within the confidence level range and generate a GUI with pre-selected results. For example, based on the model output, inventory search system 105 may determine how many results should be displayed in a GUI. Further, inventory search system 105 may determine whether to auto-select the top prediction or multiselect (e.g., based on a threshold) top results having similar confidences scores. For instance, inventory search system 105 may determine how many of the results should be displayed and that all results with a confidence about 40% should be displayed and default multiselected. (e.g., default multiselect results with confidence of 45%, 44%). In some embodiments, the pre-selection or default selection may be based the specific output of classification models. For instance, if the model only predicts make/model, inventory search system 105 may only default select with make/model. However, if the predictive model is trained for make/model/Year/trim, body style, and color, inventory search system 105 could pre-select for the different parameters.

By pre-selecting or default multiselecting results, inventory search system 105 may improve the user experience by automating some of the user selections. For example, pre-selecting results based on confidence level in GUIs like the ones presented in FIGS. 16-17, may facilitate user interaction and improve maneuverability of the GUI preventing potential inaccurate selections. For example, inventory search system 105 may identify top results in the subset (the top results being associated with highest probability scores), determine whether differences of corresponding probability scores between top results are within a range and pre-select interactive icons correspond to the top results when the differences of corresponding probability scores between top results are within the range.

However, if inventory search system 105 determines that the confidence levels of results are not within the range (step 1316: No), process 1300 may continue to step 1320. In step 1320, inventory search system 105 may pre-select or default select the highest result only and generate a GUI with the pre-selected top result. In such scenarios, the likelihood that the top result is relevant for the user is greater that the probability that other results are relevant for the user. Thus, to attempt to minimize user interactions with the GUI and prevent inaccurate entries, inventory search system 105 may select only one of the classification results in the GUI. In such embodiments, inventory search system 105 may pre-select only an interactive icon corresponding to the first result with highest probability when the differences of corresponding probability scores between top results is not within the range.

Figure 17:
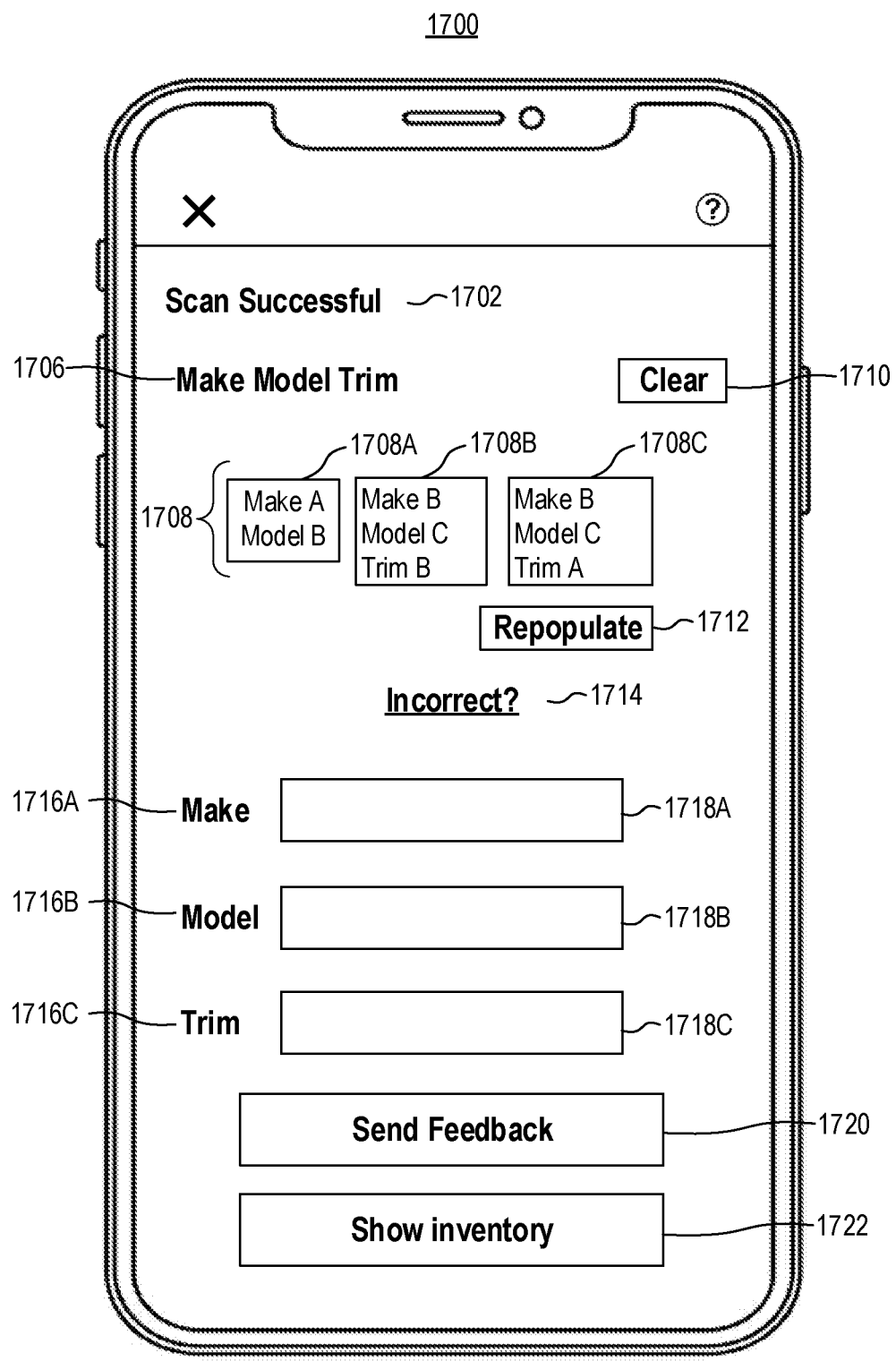
FIG. 17 is an exemplary third graphical user interface showing preliminary results and user input boxes, according with disclosed embodiments.
Figure 18:
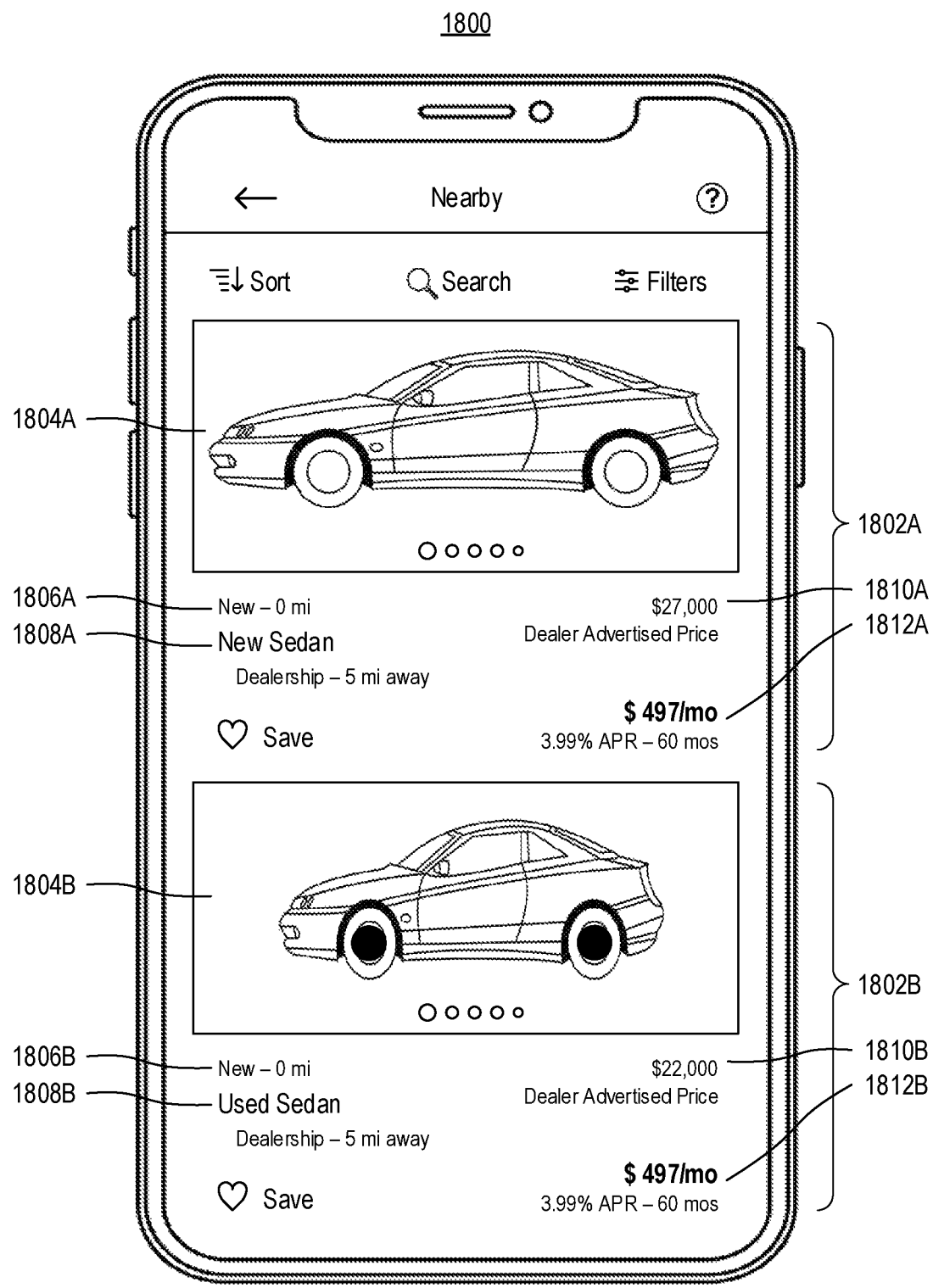
FIG. 18 is an exemplary fourth graphical user interface showing classification results, according with disclosed embodiments.

Process 1300 may be used to generate GUIs like the ones presented in FIGS. 16-18 to adjust the display for client devices 150. As previously discussed, these processes may improve the technical field of generating GUIs by automatically selecting the most relevant information and presenting the highest relevant information to the client while complying with display and visualization preferences restrictions.

Figure 14:
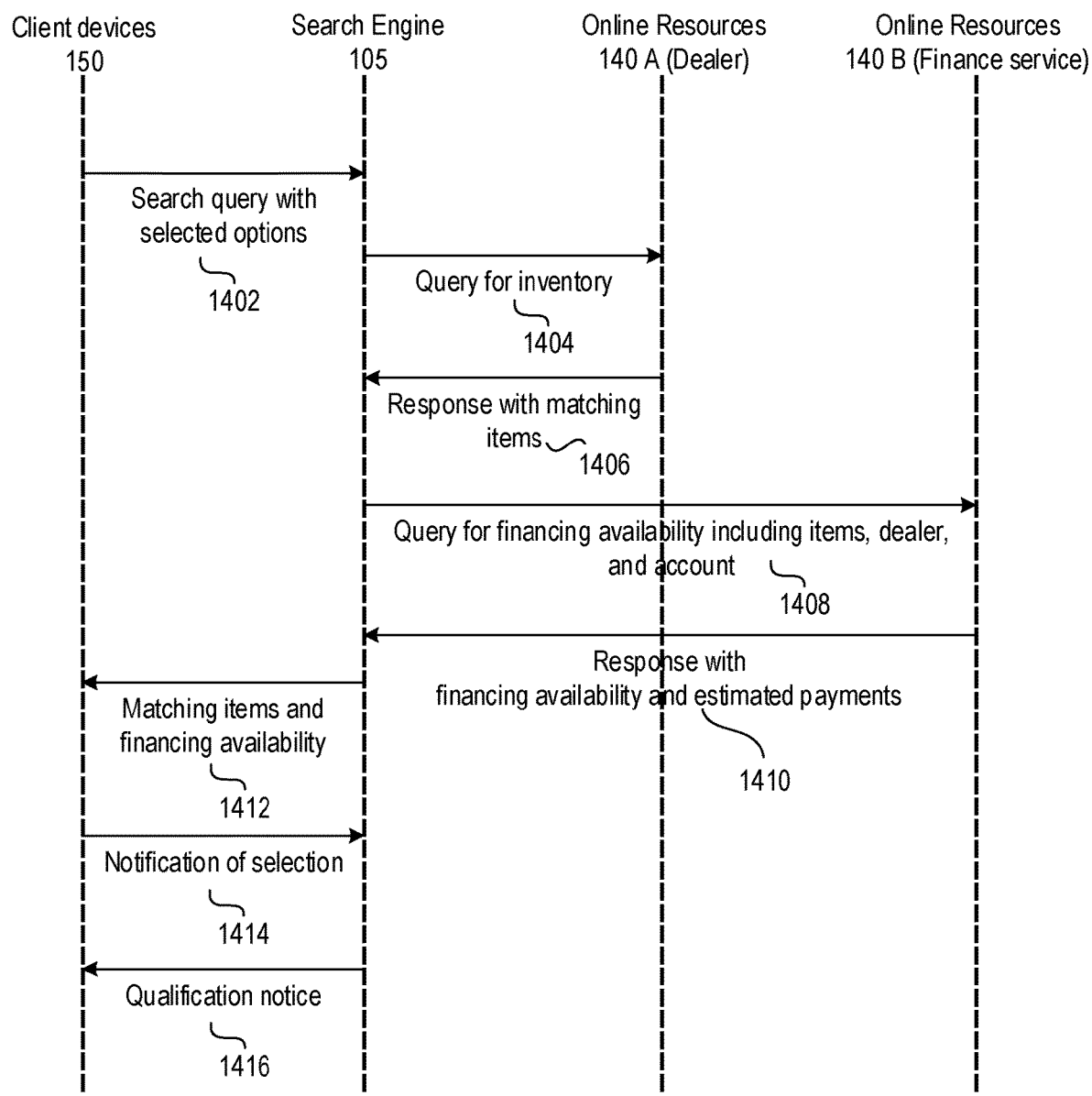
FIG. 14 is a process flow illustrating an exemplary communication sequence, consistent with disclosed embodiments.

FIG. 14 is an exemplary process flow illustrating a communication sequence, consistent with disclosed embodiments. As shown in FIG. 14, communication sequence 1400 may involve multiple elements of system 100, including client devices 150, inventory search system 105, and online resources 140. However, other elements of system 100 may be involved in communication sequence 1400. For example, databases 180 may perform some of the steps of communication sequence 1400.

In step 1402, client devices 150 may transmit search queries to inventory search system 105. In some embodiments the query sent in step 1402 may include user-selected options. For example, the query may include options a user selects in a GUI displayed in client devices 150, such as the GUIs shown in FIG. 16. Further, the query may include user account information and/or location information of client devices 150. The account information may be based on login credentials to vehicle identification application 514 (FIG. 5). In some embodiments, to transmit the query client devices 150 may determine a location of corresponding client devices, transmit a search query to a server. Further, the query may include identified attributes in a sample image, options selected with interactive icons, user input in input icons, and/or the location.

In step 1404, client devices 150 may query for inventory of items based on the query received in step 1402. For example, if the query in step 1402 asks inventory search system 105 to look for "black 2019 BMW in Washington D.C.," inventory search system 105 may transmit an inventor query in step 1404. The inventory query may be an HTTP query, but other communication protocols are also possible. As shown in FIG. 14, the inventory query may be transmitted to online resources 140. For example, the inventory query may be transmitted to online resources 140A, associated with a vehicle dealer, vehicle manufacturer, or aggregator websites. Alternatively, however, the inventory query may be transmitted to databases 180, which may store up to date inventory information.

In step 1406, online resources 140 may respond to inventory search system 105 query and return available items in the query that match the query requirements. For example, online resources 140 may return a list of vehicles that match the query requirements of "black 2019 BMW in Washington D.C." The response may include images of the items, such as thumbnail images, and characteristics of the items available, such as their make, model, and year. In some embodiments, online resources 140 may be configurable to send similar results in step 1406, even if they do not comply with the query requirements. For example, online resources 140 may return 2018 vehicles in addition to 2019 vehicles.

In step 1408, inventory search system 105 may perform a second query, this time requesting financing availability. The request may be sent to online resources 140. For example, the request may be transmitted to online resources 140B, which may be associated with financing services. The query sent in step 1408 may include the items received in step 1406 that match the user selections. Further, the query may also include potential seller and potential buyer information. For example, the query for online resources 140B may include information of the user of client devices 150 that generated the query in step 1402 and information of the dealers offering the items.

In step 1410, online resources 140 may respond to the query with financing availability and estimated payments. For example, online resources 140B, associated with the finance service, may return information of whether the finance service can provide financing for purchasing items in the inventory list and tentative payment plans.

In step 1412, inventory search system 105 may send matching items with financing availability to client devices 150 that generated the query. With this information, client devices 150 may generate GUIs that display inventory search results. For example, client devices 150 may use information received in step 1412 to generate GUIs like the one presented in FIG. 18, showing secondary or inventory results after user selections.

In step 1414, client devices 150 may send a notification of selection. For example, a user of client devices 150 may select an interactive icon associated with one of the inventory results (e.g., vehicles that are available in the inventory). Then, in step 1414 client devices 150 may send a notification to inventory search system 105 that the user selected one of the inventory or secondary results.

In step 1416, inventory search system 105 may send a qualification notice. The qualification notice may include a tentative approval by finance service, the availability of the selected vehicle based on dealer inventory information. Client devices 150 may use the information received in step 1416 to generate graphical user interfaces, as displayed in FIG. 19.

Referring now to FIG. 15, there is shown an exemplary GUI 1500, consistent with disclosed embodiments. In some embodiments, graphical user interfaces may be displayed in client devices 150 and may be displayed during video streams of augmented reality applications, modifying images captured by camera 520.

In some embodiments, GUI 1500 may be displayed when a user opens an application that activates camera 520 in client device 150. For example, when a user opens vehicle identification application 514, client devices 150 may be configured to generate GUI 1500 as shown in FIG. 15.

GUI 1500 may include a background image 1502. The background image maybe a 'live' image (i.e., an image being directly fed from camera 520). In other embodiments, however, background image 1502 may be static image, previously captured and stored.

Background image 1502 may be overlaid with information icon 1504. Using image classification processes, such as process 600, client devices 150 may learn attributes of background image 1502. For example, when there is a vehicle in background image 1502, client devices 150 may learn attributes such as make, model, and trim using identification models (e.g., convolutional neural networks). Client devices 150 may use that identification information to create information icon 1504 and overlay it on background image 1502. Information icon 1504 may include vehicle attributes such as make, model, trim, and also inventory information (i.e., item availability) and financing options (e.g., price point).

GUI 1500 may also include a banner 1508 that includes additional information for the vehicle identified in background image 1502. Banner 1508 may include buttons 1506 to display additional similar vehicles, a thumbnail 1510 displaying an inventory image of identified vehicles, and additional information 1512. Additional information 1512 may include the same information displayed in information icon 1504 or information with additional details. For example, additional information 1512 may also include dealer information and tentative payment installments.

While banner 1508 in FIG. 15 shows a single item, in some embodiments banner 1508 may include a list of items. The items displayed may have some similarity with attributes extracted from background image 1502 and may be selected based on processes to improve user experience as further described in connection with FIG. 13.

Referring now to FIG. 16, there is shown an exemplary GUI 1600, consistent with disclosed embodiments. In some embodiments, GUI 1600 may be displayed in client devices 150 and may be displayed once a user captures a sample image to be searched. For example, GUI 1600 may be displayed after a user captures an image using camera 520.

GUI 1600 may include a title 1602 describing that a scan of an image was successful and that preliminary results are presented below. The preliminary results may be identified using process 600 and use identification models generated by model generator 120 (FIG. 3). Preliminary results, or a subset of preliminary results, may be presented as interactive result icons 1608. Interactive result icons 1608 may be buttons, graphical selectors, and/or check boxes. In some embodiments, interactive result icons 1608 may display thumbnail images of results. For example, interactive result icons 1608 may include thumbnails of vehicles identified as preliminary results in process 600. Alternatively, or additionally, interactive result icons 1608 may include attributes of the results. For example, as described in FIG. 16, interactive result icons 1608 may display vehicle attributes for the results such as Make, Model, and Trim Line. In some embodiments, GUI 1600 may include a subtitle 1606 that is based on the attributes displayed in interactive result icons 1608.

In some embodiments, interactive result icons 1608 may be programmed to change appearance when selected. For example, interactive result icons 1608 may be programmable objects that change color, transparency, size, font, and/or general appearance when selected. In such embodiments, for example, interactive result icons 1608 may be programmed, not only to transmit a selection, but also to execute scripts such as:

[buttonName setTitleColor:[UIColor blackColor] forState:UIControlStateNormal];
buttonName.setTitleColor(UIColorblackColor(   ), forState: .Normal)
buttonName.setTitleColor(UIColor.white, for: .normal).

GUI 1600 may also include an "Inaccurate" button 1610 and/or a "Repopulate" button 1612. As further described in connection to FIG. 12, when a user is unsatisfied with the preliminary results shown in interactive result icons 1608, the user many notify a server that the results are inaccurate and or request additional results to be displayed in GUI 1600. "Inaccurate" button 1610 may notify a server that the presented preliminary results are not relevant. In some embodiments, selecting Inaccurate" button 1610 may result in the generation of a feedback message to, for example, inventory search system 105. In turn, inventory search system 105 may update the training data set and generate a patch, as described in process 1200 (FIG. 12). Alternatively, or additionally, a user may select "Repopulate" button 1612 to request additional results to be displayed in GUI 1600, as further described in connection with process 1300 (FIG. 13). Further, client devices 150 may be configured to modify the results icons by displaying a second subset of the first results when receiving a selection of the repopulate icon, the second subset being different form the first subset.

GUI 1600 may also include one or more options or filter elements that may be displayed in GUI 1600 as filter icons. Filter icons may be related to option labels 1626 and may include slider icons, buttons, selection boxes, or general selectors. As shown in FIG. 16, GUI 1600 may include a slider icon 1616 to filter results based on year, or year range. Slider icon 1616 may be associated with label 1626A. In some embodiments, however, slider icon 1616 may be substituted with a calendar icon, a text field, or similar date-related selection. GUI 1600 may also include style filter icons 1618. Style filter icons may be associated with label 16268 and include buttons or selectors. In some embodiments, style filter icons 1618 may be programmed to change appearance when selected. Similarly, GUI 1600 may include color filter icons 1620, associated with label 1626C, and features filter icons 1622, associated with label 1626D.

As shown in FIG. 16 some of the icons may be preselected and may have a changed appearance as soon as the GUI is created. For example, color filter icons 1620 may be programmed with the following operations to change color, but transparency, contrast, size, font, or other attributes may also be manipulated to change appearance:

let origImage=UIImage(named: "imageName");
let tintedImage=origImage_RenderingMode(.alwaysTemplate);
btn.setImage(tintedImage, forState: .normal);
btn.tintColor=.redColor;
function deneme_deneme_OpeningFcn(hObject, eventdata, handles, varargin);

Other processes to change dynamically icon appearance may include:

jFrame=get(handles.figure1,'javaframe');
jicon=javax.swing.ImageIcon('icon.gif");
jFrame.setFigureIcon(jicon);
handles.output=hObject;
guidata(hObject, handles);

As previously disclosed in connection with FIG. 7, selection of interactive result icons 1608, features filter icons 1622, or color filter icons 1620, may result in a dynamic change of GUI 1600. For example, depending on the selection of interactive result icons 1608 some of the filter icons 1616-1622, may be eliminated or added based on the availability of the options for the selected result. For example, client devices 150 may modify the appearance of GUI 1600 based on user selections using methods such as "repaint( )" "revalidate( )" and "doLayout( )."

Further, as previously discussed in connection with FIG. 13, based on results confidence levels and/or visualization preferences, some of the filter icons in GUI 1600 or the interactive result icons 1608 may be preselected to facilitate user navigation an minimize opportunities of inaccurate selections, improving the technical field of generating GUIs. For example, based on the model output, different results may be displayed in GUI 1600 and inventory search system 105 may determine how many results to show, whether to auto-select results (based on a threshold of the top results and their confidence score similarity). In such embodiment, the auto-selected results may be based on the specific output of the models. If the model predicts make/model, the auto selection can be based on make/model. But if the model predicts make/model/Year/trim, body style, and color, the default auto-selection (or pre-selection) may be based on these parameters.

Moreover, GUI 1600 may include a search button 1624. Search button 1624 may be an object programmed to generate queries. For example, when a user selects search button 1624, client devices 150 may transmit queries for inventory search results in step 1402 (FIG. 14).

Further, in generating GUI 1600 inventory search system 105 may customize icons and preliminary results displayed in GUI 1600. For example, depending on sample images, user selections of characteristics, and image classification or prediction model results, inventory search system 105 may query a lookup table or perform a search to know what trim, year, body style, colors, features, etc. are available for the identified or selected combinations. In some embodiments, based on the make and model identified for a vehicle, inventory search system 105 may populate GUI 1600. Then, a user may choose to default multiselect the top two make/model predictions, icons 1618 and labels 1626 may be populated based on those and available options. In some embodiments, as further described in connection to FIG. 6, the availability may be determine based on area, specific dealership, or within a certain radius, or what is available from the manufacturer.

As discussed in connection to FIG. 7, icons 1618 may be dynamic. For instance, if a user changes the selection of make/model, labels 1626 and icons 1618 may get repopulated. In such embodiments, the updates to GUI 1600 may be based on auto or pre-selected options, which may be based on popularity, user defined preferences, or confidence values. Further, if inventory search system 105 employees a model predicting make/model/trim and color, those specific characteristics may be auto-selected based on the model outputs as described in connection to FIGS. 6-7.

Referring now to FIG. 17, there is shown an exemplary GUI 1700, consistent with disclosed embodiments. In some embodiments, GUI 1700 may be displayed in client devices 150 and may be displayed once a user captures a sample image to be searched. For example, GUI 1700 may be displayed after a user captures an image using camera 520 (FIG. 5).

Similar to GUI 1600, GUI 1700 may include a title 1702 describing that a scan of an image was successful and that preliminary results are presented below. Further, GUI 1700 may include interactive result icons 1708 that are similar to interactive result icons 1608 presented in FIG. 16, including animations to change appearance of icons when they are selected and thumbnails or attributes of the identified results. In some embodiments, interactive result icons 1708 may be configured as graphical objects that may transmit messages to a server or change text in buttons when selected. For example, interactive result icons 1708 may perform scripts such as:

function change( )// no ';' here
{var elem=document.getElementById("myButton1");
if (elem.value=="Selected Model") elem.value="Open Curtain";
else elem.value="Not selected model";}

Moreover, GUI 1700 may also include a repopulate icon, which may be configured to triggered operations similar to the ones described in for repopulate icon 1612 and process 1300.

GUI 1700 may also include a "Clear" button 1710. "Clear" button 1710 may be configured to remove interactive result icons 1708. For example, if a user decides that the preliminary results are irrelevant and wants to focus on other elements of the GUI, the user may select "Clear" button 1710 which may delete interactive result icons 1708 with operations such as:

Gui+LastFound;
WTNCA_NODRAWICON:=2;
WTNCA_NOSYSMENU:=4;
DllCall("uxtheme\SetWindowThemeAttribute", "ptr", WinExist( )
, "int", 1, "int64*", 6|6<<32, "uint", 8);
Gui Show, W200 H100, Furthermore, GUI 1700 may include fields for user input and to provide feedback and address inaccuracies in the image classification and/or classification model. Thus, GUI 1700 may include a subtitle 1714 indicating GUI elements to provide feedback. Feedback elements 1718 may include text fields (1718A-1718C) that may capture user input. Alternatively, feedback elements 1718 may include drop-down menus, selectors, or other interactive icons that enable the user to input information. In some embodiments, feedback elements 1718 may be adapted based on the user input. For example, when feedback elements 1718 are text fields, the text fields may include predictive auto-fill options.

Feedback elements 1718 may be specific for certain aspects of image recognition. For example, as shown in FIG. 17, feedback element 1718A may be dedicated to receiving feedback for vehicle Make, and may be associated with a label 1716A that displays the type of feedback that can be entered in feedback element 1718A. Similarly, feedback element 17188 may be dedicated to receiving feedback for vehicle Model and may be associated with a label 1716A. Further, feedback element 1718C may be dedicated to receiving feedback for vehicle Trim and may be associated with a label 1716C. Other feedback elements 1718 for different aspects or attributes may also be displayed in GUI 1700. For example, feedback elements 1718 for attributes such as color, features, and/or body style may also be displayed in GUI 1700.

GUI 1700 may also include a "Send Feedback" button 1720. "Send Feedback" button 1720 may be an object programed to generate feedback messages to a server. For example, as further discussed in connection to process 1200 (FIG. 12), when a user selects "Send Feedback" button 1720 the captured image may be labeled and sent to inventory search system 105 to include the image as part of the training dataset and update the model to attempt to correct inaccuracies. Alternatively, or additionally, in some embodiments when a user selects "Send Feedback" button 1720, client devices 150 may perform operations of determining whether the at least one input icon is empty, transmitting, to a server in system 100, the captured image and input in the at least one input icon when determining the at least one input icon is not empty. When the feedback elements 1718 are not empty, it may indicate that the user is sending a correction of the image classification results. Thus, selection of "Send Feedback" button 1720, or a "Show Inventory" button 1722 (described below), may result in transmission of corrected data. In such embodiments, client devices 150 or inventory search system 105 may be configured to receive, from the server, a patch for the classification model, which may include updated model parameters. This process may facilitate correcting models and improve the model performance.

Alternatively, or additionally, GUI 1700 may include a "Show Inventory" button 1722. When selected, "Show Inventory" button 1722 may send a query for secondary results without any selected options or any filtering conditions. For example, when a user decides that interactive result icons 1708 are not relevant, a user may select to review all elements in the inventory by selecting "Show Inventory" button 1722. In some embodiments, "Show Inventory" button 1722 may generate a transmit a search query to online resources 140, instead of inventory search system 105, to directly get information from dealers or automobile manufacturers without an intermediary to minimize network congestion.

Referring now to FIG. 18, there is shown an exemplary GUI 1800, consistent with disclosed embodiments. In some embodiments, GUI 1800 may be displayed in client devices 150 and may be displayed once a user selects an interactive icon that generates a query for secondary results or inventory results. For example, GUI 1800 may be displayed after a user selects search button 1624 (FIG. 16).

GUI 1800 may include a list of results that may be composed of available items that match selections by the user in previous GUIs. For example, GUI 1800 may display inventory or secondary results that match options or preliminary results selected in GUI 1600. GUI may display secondary results 1802 (e.g., 1802A-1802B). Each of the secondary results 1802 may include an image 1804 (e.g., 1804A-1804B) and a condition 1806 (e.g., 1806A-1806B). Further, each of the secondary results 1802 may display a distance and condition 1806, based on inventory results and client devices 150 location, a vehicle description 1808 (e.g., 1808A-1808B), a price 1810 (e.g., 1810A-1810B), and financing options 1812 (e.g., 1812A-1812B). As described in connection to FIGS. 10 and 14, the inventory queries may be complemented with queries to online resources 140 that indicate availability of financing options.

As shown in FIG. 18, multiple secondary or inventory results may be displayed in GUI 1800 in the form of a list. However, in other embodiments secondary results 1802 may be displayed in a carousel view or in mosaics based on display availability and/or user preferences. Further, GUI 1800 may also include "Search," "Filter," or "Sort" icons to help navigate the results obtained. In addition, GUI 1800 may include "Save" buttons for each of secondary results 1802, which may store results information in local memories, such as memory 510.

Figure 19:
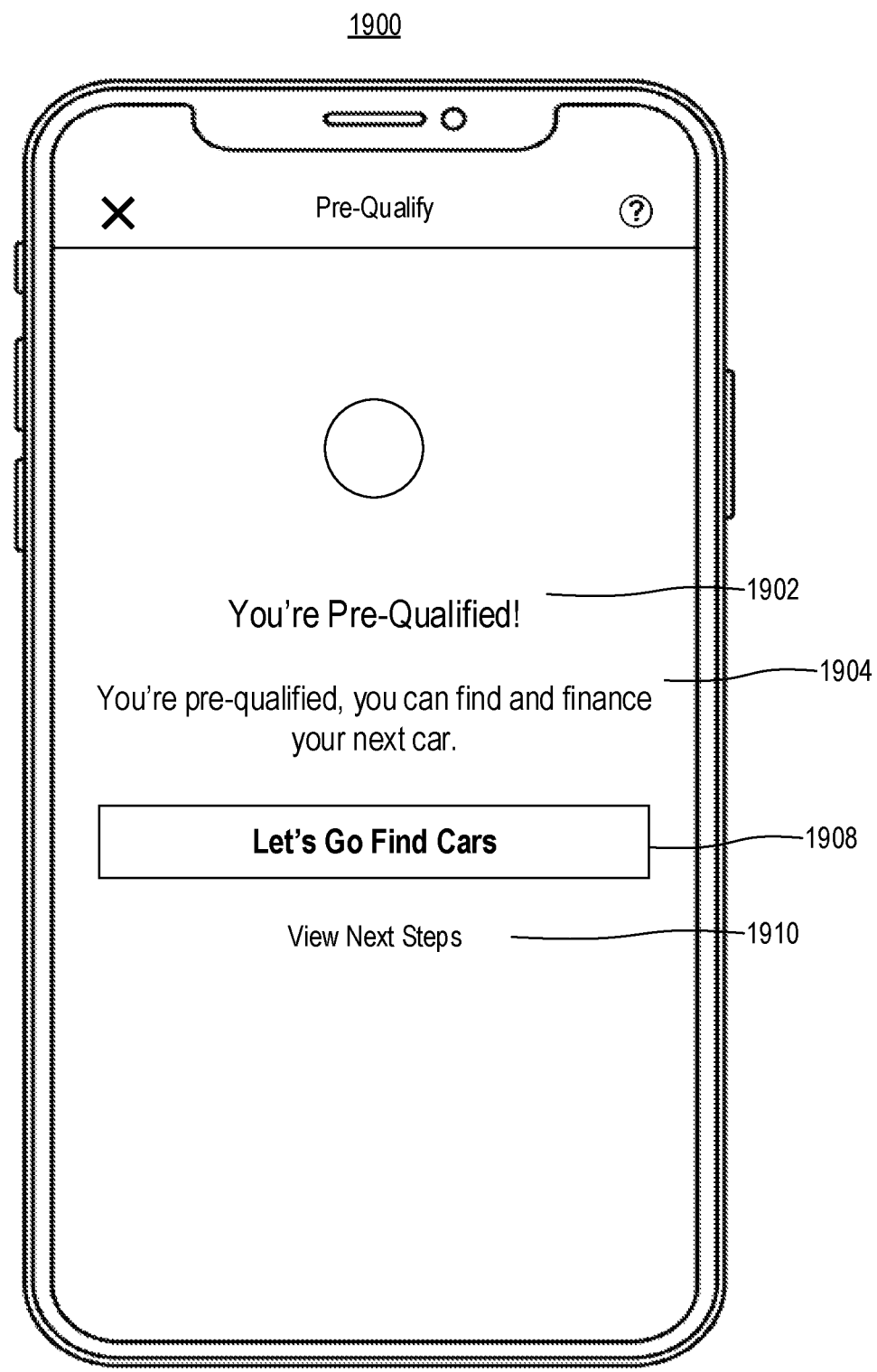
FIG. 19 is an exemplary fifth graphical user interface showing a notification message, according with disclosed embodiments.

Referring now to FIG. 19, there is shown an exemplary GUI 1900, consistent with disclosed embodiments. In some embodiments, GUI 1900 may be displayed in client devices 150 and may be displayed once a user selects a result of an item he is interested in. For example, GUI 1900 may be displayed after a user selects secondary results 1802.

GUI 1900 may include a notice 1902 and a message 1904. Further, GUI 1900 may include buttons for connecting with online resources 140. For example, next steps button 1910 may open websites or resources associated with online resources 140 associated with dealers or financial services. Further, GUI 1900 may include a "Find Cars" button 1908 which may display additional results or connect client devices 150 with dealers or automobile manufacturers. For example, when selecting find "Find Cars" button 1908, client devices 150 may be configured to connect to a dealer website that carries selected vehicles of interest to the user.

Figure 20:
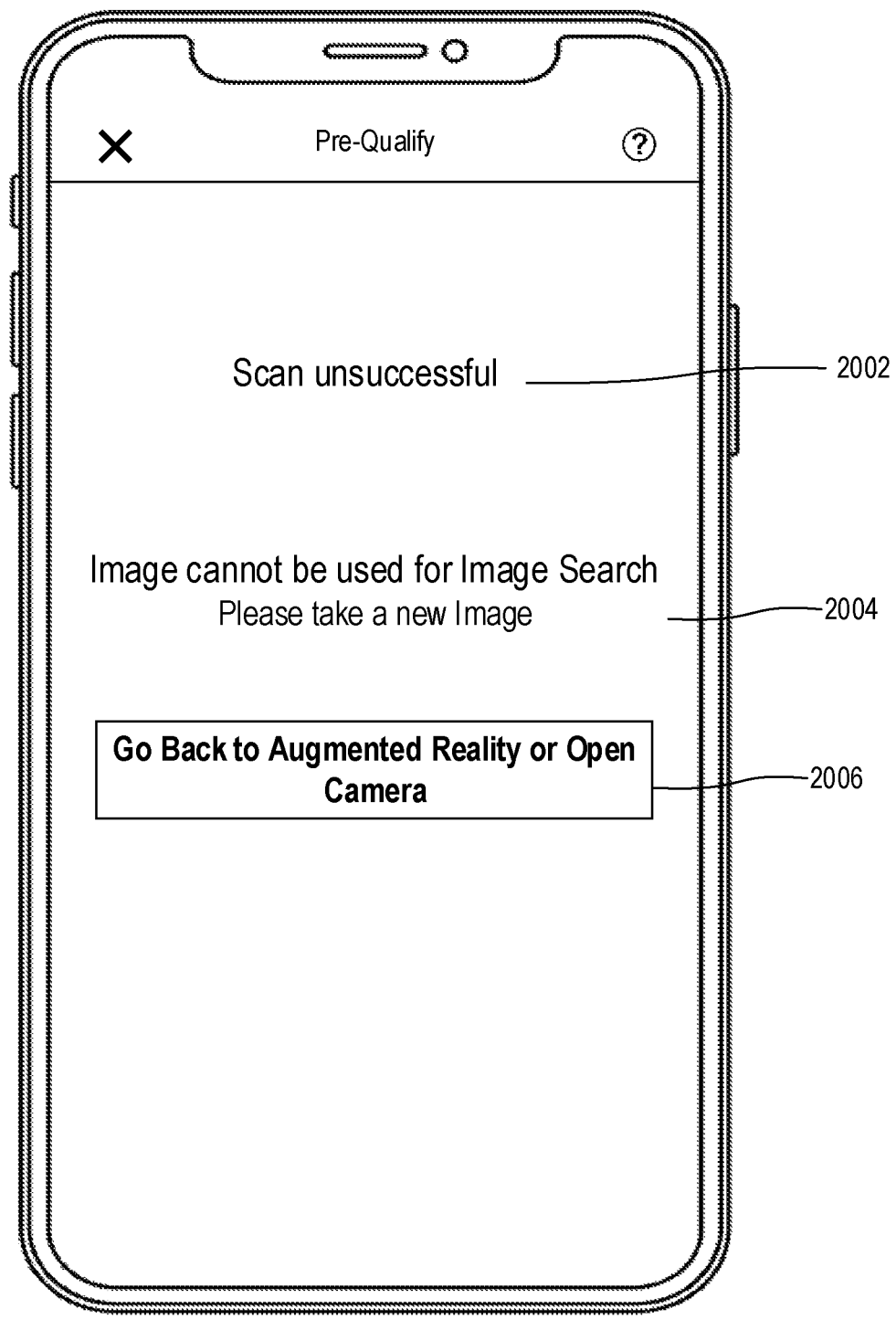
FIG. 20 is an exemplary sixth graphical user interface showing an error notification message, according with disclosed embodiments.

Referring now to FIG. 20, there is shown an exemplary GUI 2000, consistent with disclosed embodiments. In some embodiments, GUI 2000 may be displayed in client devices 150 and may be displayed once a user captures an image. For example, GUI 2000 may be displayed after a user captures an image using camera 520.

GUI 2000 may be displayed when the sample image the user captured for image classification is not acceptable for identification. For example, GUI 2000 may be displayed in step 608 (FIG. 6). An image may not be acceptable for identification because it does not have a necessary format or quality to extract image attributes, as described in process 600.

GUI 2000 may include a notice 2002 and a message 2004. Further, GUI 2000 may include a "Back" button 2006. In some embodiments, when a user selects "Back" button 2006, client devices 150 may reopen an augmented reality application or an application for camera 520 to recapture an image.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted. Furthermore, while some of the exemplary embodiments of the computerized methods were described using Java language or C to illustrate exemplary scripts and routines, the disclosed methods and systems may be implemented using alternative languages. The disclosed embodiments may use one or multiple programming languages in addition to Java or C. For example, the disclosed embodiments may also be implemented using Python, C++, C#, R, Go, Swift, Ruby, and/or their combinations.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. An apparatus for classifying images, comprising:
   a camera;
   at least one storage device storing a set of instructions; and at least one processor coupled to the at least one storage device and the camera, the instructions configuring the at least one processor to perform operations comprising:
- executing an augmented reality application, the augmented reality application configured for displaying modified video feeds comprising icons or information superimposed on background images;
- capturing an image by the camera, the captured image being a frame of a video feed displayed in the augmented reality application;
- identifying attributes of the captured image using a classification model, the classification model comprising a convolutional neural network;
- identifying first results based on the attributes, the first results being associated with probability scores;
- selecting a subset of first results based on the probability scores, the first results in the subset having an accumulated probability score greater than a threshold probability score;
- generating a first graphical user interface, the first graphical user interface comprising:
  - interactive icons corresponding to first results in the subset, at least one input icon, and
  - a first button;
- receiving a selection of the first button;
- upon receiving the selection:
  - performing a search to identify second results, the search being based on at least one of selected interactive icons or input in the at least one input icon; and
  - generating a second graphical user interface, different from the first graphical user interface, displaying the second results;
- determining whether the at least one input icon is empty;
- transmitting, to a server, the captured image and input in the at least one input icon when the at least one input icon is determined not to be empty; and
- receiving, from the server, a patch for the classification model, the patch comprising updated model parameters and a classification model exception for the identified attributes.

2. The apparatus of claim 1, wherein transmitting the captured image comprises modifying metadata of the captured image to include the input in the at least one input icon.

3. The apparatus of claim 1, wherein the classification model exception is based on the input in the at least one input icon.

4. The apparatus of claim 1, wherein
the patch comprises updates for convolution layers and updates for connection layers of the convolutional neural network.

5. The apparatus of claim 1, wherein selecting the subset comprises:
- determining whether a number of the first results in the subset is below a minimum number;
- determining a location of the apparatus when the number of the first results in the subset is below the minimum number;
- selecting a group of the first results based on the location, results in the group being different from results in the subset; and
- adding the group of first results to the subset.

6. The apparatus of claim 5, wherein selecting the subset further comprises:
- determining whether the number of first results in the subset is above a maximum number, the maximum number being based on visualization preferences; and
- eliminating first results in the subset associated with lower probability scores until the number of first results in the subset matches the maximum number.

7. The apparatus of claim 1, wherein generating the first graphical user interface comprises:
- identifying top results in the subset, the top results being associated with highest probability scores;
- determining whether differences of corresponding probability scores between top results are within a range;
- pre-selecting interactive icons correspond to the top results when the differences of corresponding probability scores between top results are within the range; and
- pre-selecting only an interactive icon corresponding to the first result with highest probability when the differences of corresponding probability scores between top results is not within the range.

8. The apparatus of claim 1, wherein the interactive icons are arranged in the first graphical user interface based on the probability score associated with corresponding first results.

9. The apparatus of claim 1, wherein performing the search comprises:
- determining a location of the apparatus;
- transmitting a search query to a server, the query comprising:
  - the identified attributes,
  - at least one of selected interactive icons or user input in the at least one input icon, and
  - the location; and
- receiving the second results from the server.

10. The apparatus of claim 1, wherein the at least one input icon comprises at least one of a text field or a dropdown menu.

11. The apparatus of claim 1, wherein:
the captured image is an image of a vehicle; and
the identified attributes comprise vehicle make and vehicle model.

12. The apparatus of claim 11, wherein the identified attributes further comprise vehicle trim level and vehicle color.

13. The apparatus of claim 12, wherein the at least one input icon comprises:
- a first input icon displayed with a label of vehicle make; and
- a second input icon displayed with a label of vehicle model.

14. The apparatus of claim 13, wherein the at least one input icon further comprises a third input icon displayed with a label of vehicle trim level.

15. The apparatus of claim 11, wherein the interactive icons display thumbnail images of vehicles matching the identified attributes.

16. The apparatus of claim 1, wherein
the operations further comprise modifying portions of the video stream to superimpose an icon displaying the identified attributes.

17. The apparatus of claim 1, wherein the interactive icons comprise icons configured to change color when selected or unselected.

18. A system for classifying images, comprising:
one or more processors; and
one or more storage devices storing instructions that, when executed, configure the one or more processors to perform operations comprising:

executing an augmented reality application, the augmented reality application configured for displaying modified video feeds comprising icons or information superimposed on background images;

identifying attributes of a captured image using a classification model, the classification model comprising a convolutional neural network, the captured image being a frame of a video feed displayed in the augmented reality application;

identifying first results based on the identified attributes, the first results being associated with probability scores;

selecting a subset of the first results based on corresponding probability scores, the first results in the subset having an accumulated probability score greater than a threshold probability score;

generating a first graphical user interface, the first graphical user interface comprising:
- interactive icons corresponding to first results in the subset,
- at least one input icon, and
- a button; and upon receiving a selection of the button:
- performing a search to identify second results, the search being based on at least one of selected interactive icons or input in the at least one input icon; and
- generating a second graphical user interface, different from the first graphical user interface, displaying the second results;

determining whether the at least one input icon is empty;

transmitting, to a server, the captured image and input in the at least one input icon when the at least one input icon is determined not to be empty; and receiving, from the server, a patch for the classification model, the patch comprising updated model parameters and a classification model exception for the identified attributes.

19. A computer-implemented method for classifying images, the method comprising:

executing an augmented reality application, the augmented reality application configured for displaying modified video feeds comprising icons or information superimposed on background images;

identifying attributes of a captured image using a classification model, the classification model comprising a convolutional neural network, the captured image being a frame of a video feed displayed in the augmented reality application;

identifying first results based on the identified attributes, the first results being associated with probability scores;

selecting a subset of the first results based on corresponding probability scores, the first results in the subset having an accumulated probability score greater than a threshold probability score;

generating a first graphical user interface, the first graphical user interface comprising:
- interactive icons corresponding to first results in the subset,
- at least one input icon, and
- a first button; and upon receiving a selection of the first button:
- performing a search to identify second results, the search being based on at least one of selected interactive icons or input in the at least one input icon; and
- generating a second graphical user interface, different from the first graphical user interface, displaying the second results;

determining whether the at least one input icon is empty;

transmitting, to a server, the captured image and input in the at least one input icon when the at least one input icon is determined not to be empty; and receiving, from the server, a patch for the classification model, the patch comprising updated model parameters and a classification model exception for the identified attributes.

\* \* \* \* \*